US011211082B1

(12) United States Patent
Sasaki et al.

(10) Patent No.: US 11,211,082 B1
(45) Date of Patent: Dec. 28, 2021

(54) MAGNETIC HEAD INCLUDING SPIN TORQUE OSCILLATOR

(71) Applicants: Yoshitaka Sasaki, Los Gatos, CA (US); Hiroyuki Ito, Milpitas, CA (US); Tetsuhito Shinohara, Milpitas, CA (US); Shigeki Tanemura, Milpitas, CA (US); Kazuki Sato, Milpitas, CA (US); Yoji Nomura, Milpitas, CA (US); Hironori Araki, Milpitas, CA (US); Tetsuya Roppongi, Milpitas, CA (US)

(72) Inventors: Yoshitaka Sasaki, Los Gatos, CA (US); Hiroyuki Ito, Milpitas, CA (US); Tetsuhito Shinohara, Milpitas, CA (US); Shigeki Tanemura, Milpitas, CA (US); Kazuki Sato, Milpitas, CA (US); Yoji Nomura, Milpitas, CA (US); Hironori Araki, Milpitas, CA (US); Tetsuya Roppongi, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 17/169,995

(22) Filed: Feb. 8, 2021

(51) Int. Cl.
*G11B 5/187* (2006.01)
*G11B 5/115* (2006.01)

(52) U.S. Cl.
CPC ............ *G11B 5/115* (2013.01); *G11B 5/1875* (2013.01)

(58) Field of Classification Search
None
See application file for complete search history.

(56) References Cited

U.S. PATENT DOCUMENTS

| | | | |
|---|---|---|---|
| 8,320,079 B2 | 11/2012 | Iwasaki et al. | |
| 8,917,481 B2 | 12/2014 | Kusukawa et al. | |
| 9,824,701 B2* | 11/2017 | Tang | G11B 5/1278 |
| 10,032,470 B1 | 7/2018 | Degawa et al. | |
| 10,109,302 B1 | 10/2018 | Shinohara et al. | |
| 10,121,497 B1* | 11/2018 | Takahashi | G11B 5/315 |
| 10,410,658 B1* | 9/2019 | Liu | G11B 5/7369 |
| 10,748,559 B1 | 8/2020 | Araki et al. | |
| 10,839,829 B1* | 11/2020 | Sasaki | G11B 5/3123 |
| 2018/0075868 A1 | 3/2018 | Koui et al. | |

* cited by examiner

*Primary Examiner* — William J Klimowicz
(74) *Attorney, Agent, or Firm* — Oliff PLC

(57) ABSTRACT

A magnetic head includes a medium facing surface, a main pole, a trailing shield, a spin torque oscillator, and a first insulating layer. The first insulating layer is interposed between a portion of the main pole and a portion of the spin torque oscillator. The first insulating layer has a first end closest to the medium facing surface. The spin torque oscillator has a rear end farthest from the medium facing surface. The first end of the first insulating layer is located closer to the medium facing surface than the rear end of the spin torque oscillator is.

13 Claims, 27 Drawing Sheets

MAGNETIC HEAD INCLUDING SPIN TORQUE OSCILLATOR

BACKGROUND OF THE INVENTION

1. Field of the Invention

The present invention relates to a magnetic head including a spin torque oscillator.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is less likely to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a magnetic path forming section. The coil generates a magnetic field corresponding to data to be written on the recording medium. The magnetic path forming section is made of a magnetic material and forms a magnetic path for passing a magnetic flux corresponding to the magnetic field generated by the coil.

The magnetic path forming section includes, for example, a main pole, a trailing shield, and a return path section. The main pole has a first end face located in a medium facing surface configured to face a recording medium. The trailing shield has a second end face located in the medium facing surface at a position forward relative to the first end face in a direction of travel of the recording medium. The return path section magnetically connects part of the main pole away from the medium facing surface to the trailing shield. The main pole generates, from the first end face, a write magnetic field for writing data on the recording medium.

Recently, the use of what is called a spin torque oscillator in a magnetic head has been proposed as a method for increasing the recording density of a magnetic disk drive. U.S. Pat. Nos. 8,320,079 B2, 8,917,481 B2, 10,032,470 B1, and 10,109,302 B1 each disclose a technology of using a spin torque oscillator that generates a microwave magnetic field. According to the technology, a microwave magnetic field is generated by the spin torque oscillator, and the microwave magnetic field and the write magnetic field are simultaneously applied to a portion of the recording medium on which data is to be written. To increase the recording density, it is effective to increase the coercivity of the recording medium by making magnetic fine particles of the recording medium smaller and, at the same time, enhancing the anisotropic energy of the magnetic fine particles. The aforementioned technology enables data writing with the coercivity of the recording medium lowered by microwaves, thus enabling use of a recording medium having high coercivity.

U.S. Patent Application Publication No. 2018/0075868 A1 discloses a technology of using a spin torque oscillator that adjusts magnetic permeability. The spin torque oscillator blocks magnetic flux leaking from the main pole to the trailing shield. The technology makes it possible to make a gap between the main pole and the shield smaller. This in turn makes it possible to steepen the gradient of change in the strength of the write magnetic field to thereby increase the recording density.

In both of the above-described two technologies, the spin torque oscillator is disposed between the main pole and the trailing shield and electrically connected to the main pole and the trailing shield. A current for operating the spin torque oscillator is supplied via the main pole and the trailing shield. Hereinafter, a surface of the spin torque oscillator to be in contact with the main pole will be referred to as a bottom surface of the spin torque oscillator, and a surface of the spin torque oscillator to be in contact with the trailing shield will be referred to as a top surface of the spin torque oscillator. A surface of the main pole to be opposed to the trailing shield and in contact with the spin torque oscillator in part will be referred to as a top surface of the main pole. A surface of the trailing shield to be opposed to the main pole and in contact with the spin torque oscillator in part will be referred to as a bottom surface of the trailing shield.

Typically, for a magnetic head using a spin torque oscillator, it is possible to increase the recording density by increasing a voltage applied to the spin torque oscillator. However, if a dimension of the spin torque oscillator in a direction perpendicular to the medium facing surface (hereinafter, referred to as an element height) is small and the voltage applied to the spin torque oscillator is increased, the spin torque oscillator generates heat. This causes a problem of shortening the life of the magnetic head.

To prevent the occurrence of the foregoing problem, the element height is preferably large to some extent. However, increasing the element height lowers the current density in the spin torque oscillator, and causes a problem that the foregoing function of the spin torque oscillator is not fully exerted. If the element height is increased and the voltage to be applied to the spin torque oscillator is increased to increase the current density, there occurs a problem that the heat generation of the spin torque oscillator is unable to be sufficiently suppressed.

SUMMARY OF THE INVENTION

An object of the present invention is to provide a magnetic head including a spin torque oscillator, where the spin torque oscillator can fully exert its function while the heat generation of the spin torque oscillator is suppressed.

A magnetic head according to the present invention includes: a medium facing surface configured to face a recording medium; a main pole configured to generate a write magnetic field for writing data on the recording medium; a trailing shield formed of a magnetic material and located forward in a direction of travel of the recording medium relative to the main pole; a spin torque oscillator disposed between the main pole and the trailing shield and electrically connected to the main pole and the trailing shield; and a first insulating layer interposed between a portion of the main pole and a portion of the spin torque oscillator.

The first insulating layer has a first end closest to the medium facing surface. The spin torque oscillator has a rear end farthest from the medium facing surface. The first end of the first insulating layer is located closer to the medium facing surface than the rear end of the spin torque oscillator is.

In the magnetic head according to the present invention, the main pole may have a top surface facing toward the trailing shield, and the trailing shield may have a bottom surface facing toward the main pole. In such a case, the bottom surface of the trailing shield may include a first portion having an end located in the medium facing surface and being in contact with the spin torque oscillator at least in part, and a second portion connected to the first portion at a position away from the medium facing surface. The first portion may extend along the top surface of the main pole. A distance between the second portion and the main pole is a minimum at a border between the first portion and the second portion, and a maximum at a position away from the border. An element height that is a dimension of the spin torque oscillator in a direction perpendicular to the medium facing surface and a writer height that is a dimension of the first portion in the direction perpendicular to the medium facing surface may be different from each other.

In the magnetic head according to the present invention, the element height may be greater than the writer height. In such a case, the element height may be in a range of 40 to 100 nm. The writer height may be in a range of 10 to 35 nm. In such a case, the magnetic head according to the present invention may further include a second insulating layer interposed between a portion of the trailing shield and a portion of the spin torque oscillator. The second insulating layer has a second end closest to the medium facing surface. The second end of the second insulating layer may be located closer to the medium facing surface than the rear end of the spin torque oscillator is.

The first end of the first insulating layer may be located closer to the medium facing surface than the second end of the second insulating layer is. Alternatively, the second end of the second insulating layer may be located closer to the medium facing surface than the first end of the first insulating layer is.

The magnetic head according to the present invention may further include a heat sink. In such a case, the heat sink may be disposed between the main pole and the trailing shield at a position farther from the medium facing surface than the spin torque oscillator is, and in contact with the spin torque oscillator.

The magnetic head according to the present invention may further include a first heat sink. A portion of the first heat sink may be interposed between the spin torque oscillator and the first insulating layer. The magnetic head may further include a second heat sink. In such a case, the second heat sink may be disposed on the first heat sink at a position farther from the medium facing surface than the spin torque oscillator is, and in contact with the spin torque oscillator and the first heat sink.

In the magnetic head according to the present invention, the top surface of the main pole may include a rear portion in contact with the first insulating layer, and a front portion located between the medium facing surface and the rear portion and not in contact with the first insulating layer. In such a case, the front portion may be recessed from an imaginary plane including the rear portion in a direction away from the trailing shield. Alternatively, the first insulating layer may have an inclined surface contiguous with the front portion. In such a case, an angle that the front portion forms with respect to the direction perpendicular to the medium facing surface may be greater than an angle that the rear portion forms with respect to the direction perpendicular to the medium facing surface.

The magnetic head according to the present invention may further include a substrate having a top surface. The main pole, the trailing shield, the spin torque oscillator, and the first insulating layer may be located above the top surface of the substrate. The spin torque oscillator may have a first side surface and a second side surface opposite to each other in a track width direction. The first side surface and the second side surface respectively form a first angle and a second angle with respect to a direction perpendicular to the top surface of the substrate. The first angle and the second angle each may be in a range of 0° to 10°.

In the present invention, the spin torque oscillator has the front end closest to the medium facing surface, and the rear end opposite to the front end. The first insulating layer interposed between a portion of the main pole and a portion of the spin torque oscillator has the first end closest to the medium facing surface. The spin torque oscillator has the rear end farthest from the medium facing surface. The first end of the first insulating layer is located closer to the medium facing surface than the rear end of the spin torque oscillator is. According to the present invention, the function of the spin torque oscillator can thus be fully exerted while the heat generation of the spin torque oscillator is suppressed.

Other objects, features and advantages of the present invention will become fully apparent from the following description.

DETAILED DESCRIPTION OF THE PREFERRED EMBODIMENTS

First Embodiment

Figure 5:
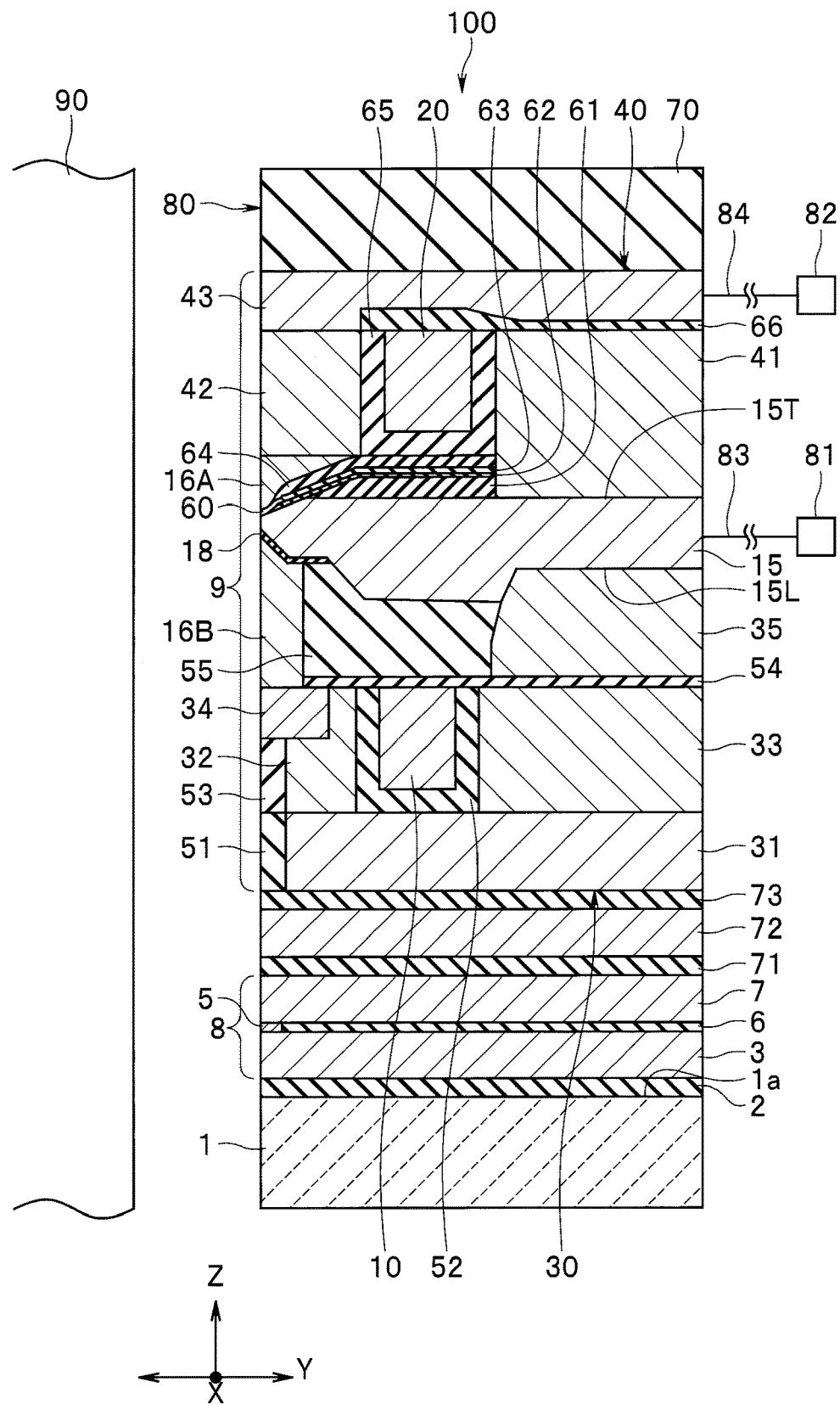
FIG. 5 is a cross-sectional view showing a configuration of the magnetic head according to the first embodiment of the invention.
Figure 6:
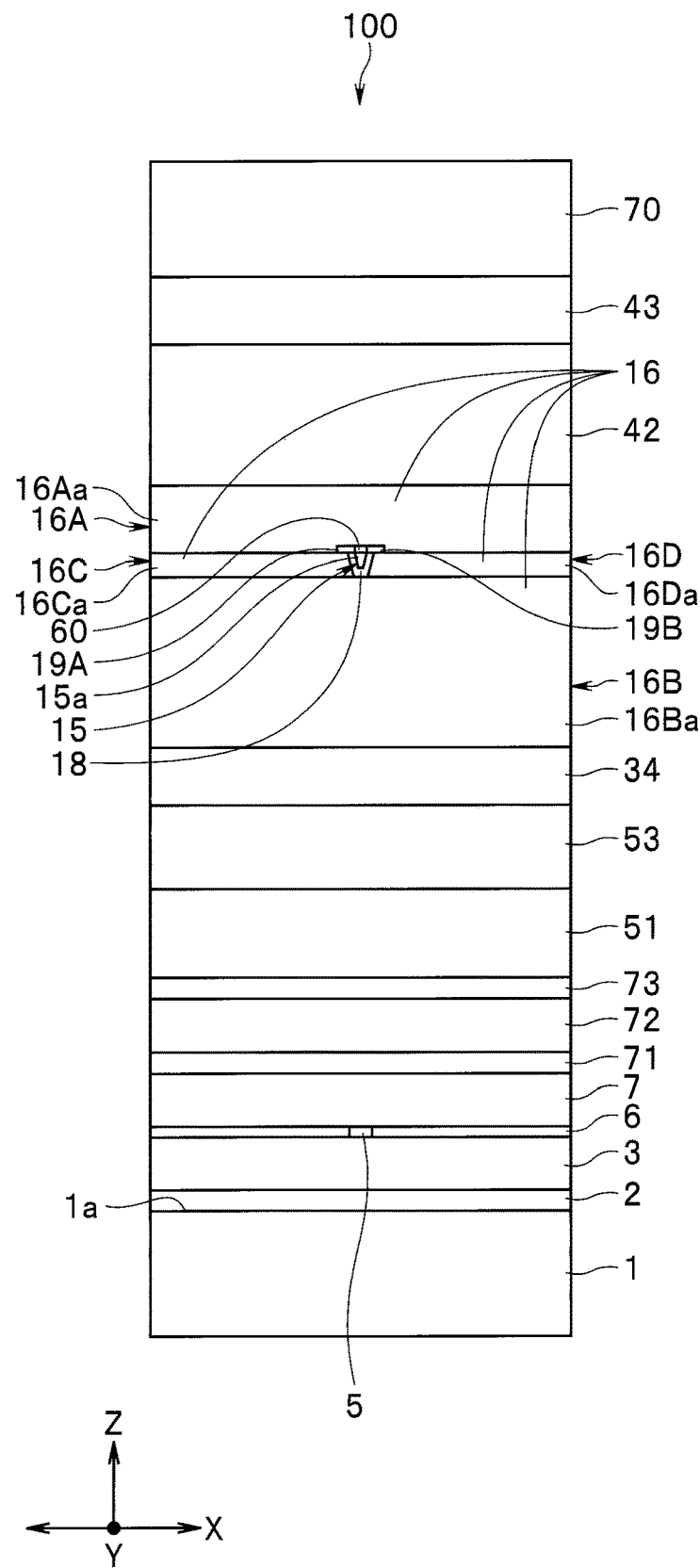
FIG. 6 is a front view showing a medium facing surface of the magnetic head according to the first embodiment of the invention.
Figure 7:
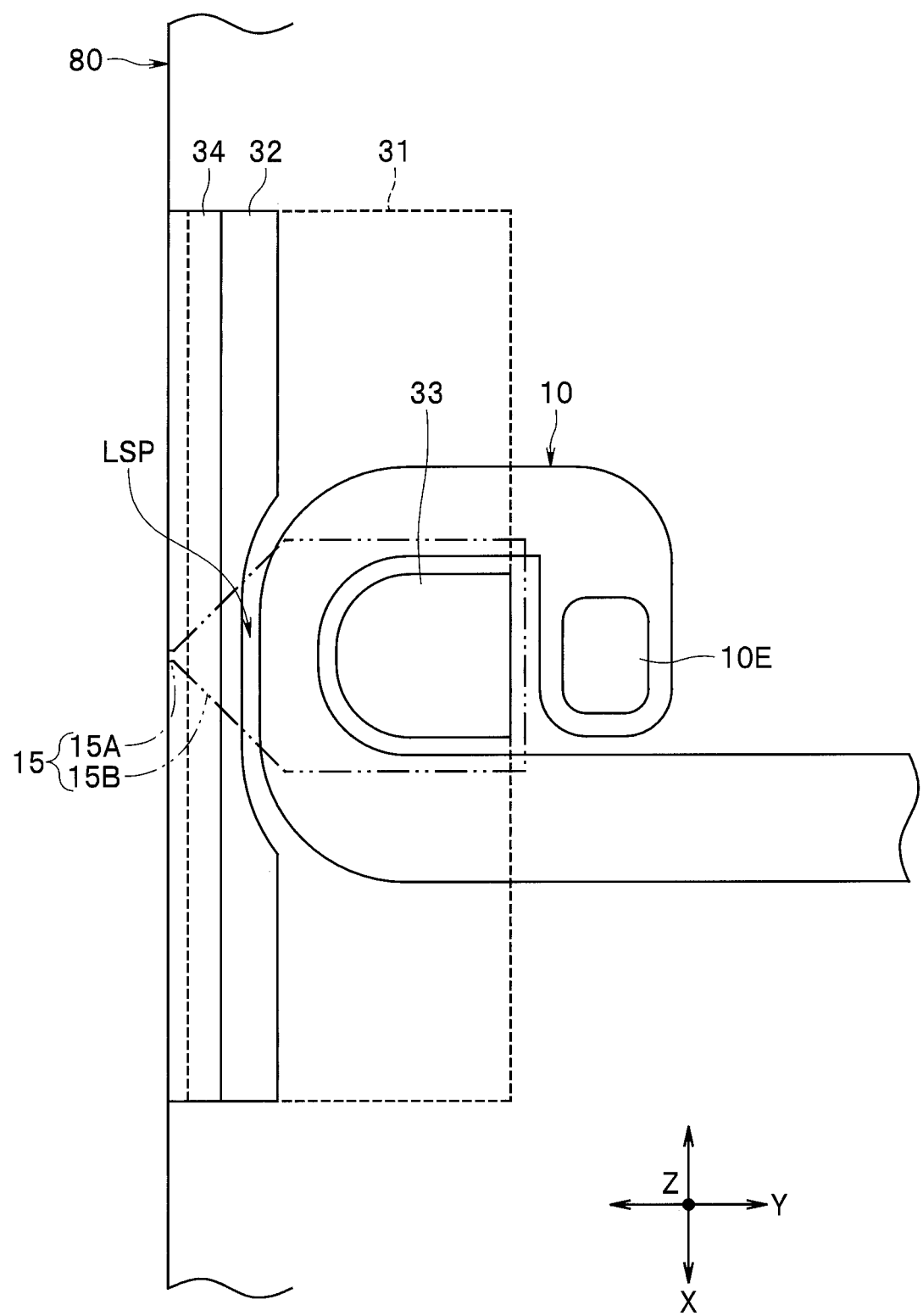
FIG. 7 is a plan view showing a lower coil portion of the magnetic head according to the first embodiment of the invention.
Figure 8:
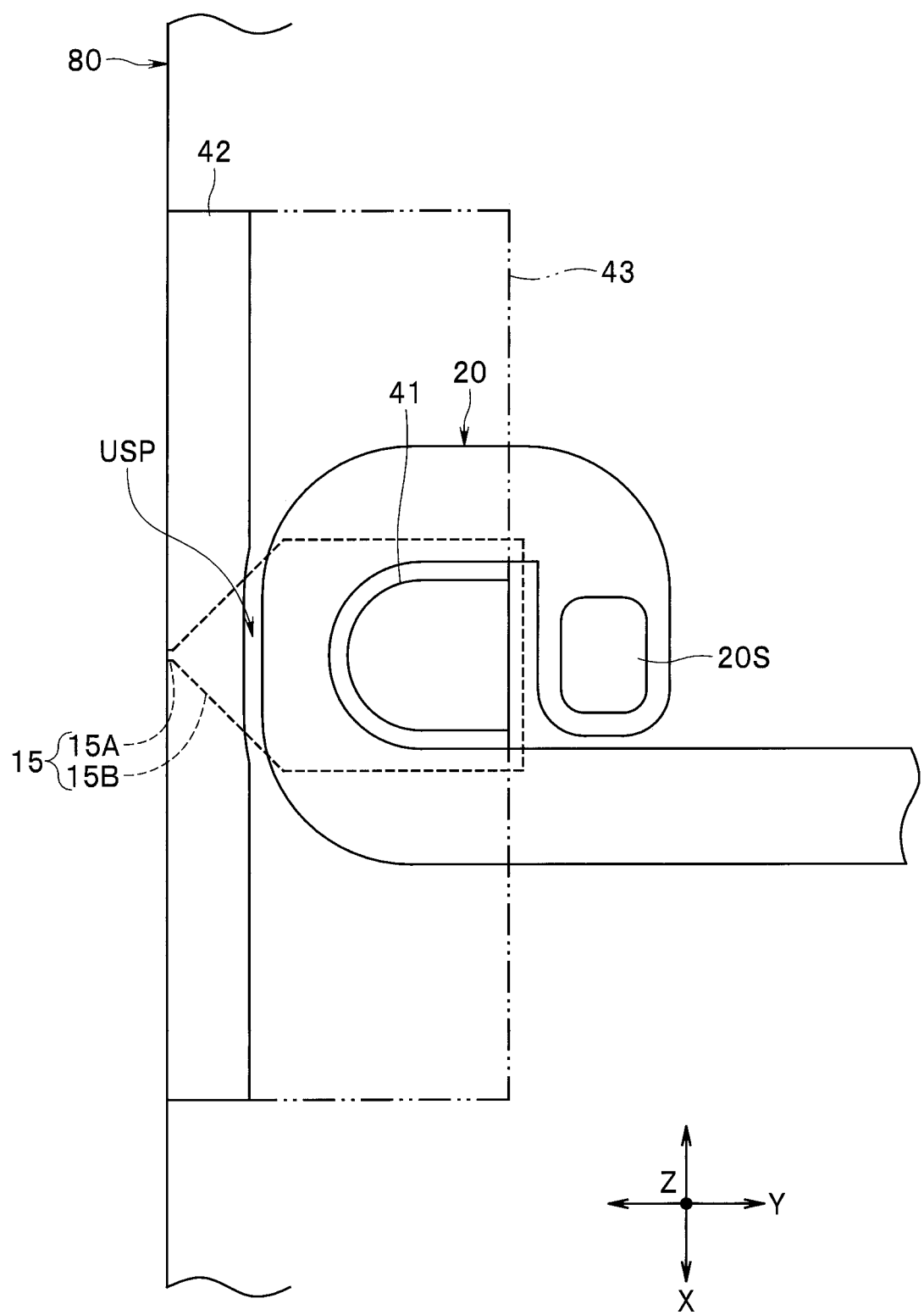
FIG. 8 is a plan view showing an upper coil portion of the magnetic head according to the first embodiment of the invention.

Preferred embodiments of the present invention will now be described in detail with reference to the drawings. First, reference is made to FIG. 5 to FIG. 8 to describe a configuration of a magnetic head according to a first embodiment of the invention. FIG. 5 is a cross-sectional view showing a configuration of the magnetic head. FIG. 6 is a front view showing the medium facing surface of the magnetic head. FIG. 7 is a plan view showing a lower coil portion of the magnetic head. FIG. 8 is a plan view showing an upper coil portion of the magnetic head.

The magnetic head 100 according to the present embodiment is one intended for perpendicular magnetic recording. The magnetic head 100 according to the present embodiment is for use with, e.g., a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

X, Y, and Z directions are defined here as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 5, the magnetic head 100 has the aforementioned medium facing surface 80. Further, as shown in FIG. 5 and FIG. 6, the magnetic head 100 includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a magnetoresistive (MR) element 5 as a read element disposed on the first read shield layer 3; an insulating layer 6 formed of an insulating material and disposed around the MR element 5; and a second read shield layer 7 formed of a magnetic material and disposed on the MR element 5 and the insulating layer 6.

An end of the MR element 5 is located in the medium facing surface 80.

The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head 100 further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has a function of shielding the MR element 5 from magnetic fields generated in the write head unit 9. The nonmagnetic layers 71 and 73 are formed of alumina, for example.

The write head unit 9 includes a coil, a main pole 15, and a write shield 16. The coil generates a magnetic field corresponding to data to be written on the recording medium 90. The coil includes an upper coil portion 20 and a lower coil portion 10. Each of the upper coil portion 20 and the lower coil portion 10 is formed of a conductive material such as copper. The upper coil portion 20 and the lower coil portion 10 are connected in series or in parallel. The main pole 15 has an end face 15a located in the medium facing surface 80, and is configured to pass a magnetic flux corresponding to the magnetic field generated by the coil and to generate a write magnetic field for writing data on the recording medium 90 by means of a perpendicular magnetic recording system. FIG. 5 shows a cross section that intersects the end face 15a of the main pole 15 and that is perpendicular to the medium facing surface 80 and to the top surface 1a of the substrate 1.

As shown in FIG. 6, the write shield 16 includes a trailing shield 16A, a leading shield 16B, a first side shield 16C, and a second side shield 16D. The trailing shield 16A is located forward relative to the main pole 15 in the direction of travel of the recording medium 90 (the Z direction). Being located forward relative to the main pole 15 in the direction of travel of the recording medium 90 refers to being located farther from the top surface 1a of the substrate 1 than the main pole 15. The leading shield 16B is located backward relative to the main pole 15 in the direction of travel of the recording medium 90. Being located backward relative to the main pole 15 in the direction of travel of the recording medium 90 refers to being located closer to the top surface 1a of the substrate 1 than the main pole 15. The first and second side shields 16C and 16D are located farther from the top surface 1a of the substrate 1 than the leading shield 16B, opposed to each other in the track width direction (the X direction) with the main pole 15 therebetween, and magnetically couple the trailing shield 16A and the leading shield 16B.

As shown in FIG. 6, the trailing shield 16A has a front end face 16Aa located in the medium facing surface 80. The leading shield 16B has a front end face 16Ba located in the medium facing surface 80. The first side shield 16C has a front end face 16Ca located in the medium facing surface 80. The second side shield 16D has a front end face 16Da located in the medium facing surface 80.

The front end face 16Aa is located forward relative to the end face 15a of the main pole 15 in the direction of travel of the recording medium 90. The front end face 16Ba is located backward relative to the end face 15a of the main pole 15 in the direction of travel of the recording medium 90. The front end faces 16Ca and 16Da are located on opposite sides of the end face 15a of the main pole 15 in the track width direction. In the medium facing surface 80, the front end faces 16Aa, 16Ba, 16Ca, and 16 Da are arranged to surround the end face 15a of the main pole 15.

The write shield 16 is formed of a magnetic material. For example, CoFeN, CoNiFe, FeNi, or CoFe may be used as the material of the write shield 16.

The write head unit 9 further includes a spin torque oscillator 60. The spin torque oscillator 60 is located between the main pole 15 and the trailing shield 16A in the vicinity of the medium facing surface 80 and electrically connected to the main pole 15 and the trailing shield 16A. The spin torque oscillator 60 may be an element configured to generate a microwave magnetic field or an element configured to adjust a magnetic permeability between the main pole 15 and the trailing shield 16A. The configuration of the spin torque oscillator 60 will be described in detail later.

The write head unit 9 further includes an upper return path section 40 and a lower return path section 30. Both the upper return path section 40 and the lower return path section 30 are formed of a magnetic material. For example, CoFeN, CoNiFe, FeNi, or CoFe may be used as the material of the upper return path section 40 and the lower return path section 30.

The upper return path section 40 is located forward relative to the main pole 15 in the direction of travel of the recording medium 90, and connects part of the main pole 15 located away from the medium facing surface 80 to the write shield 16, thereby magnetically coupling the main pole 15 to the write shield 16. The upper return path section 40 and the main pole 15 define an upper space USP (see FIG. 8) for a portion of the coil to pass through.

The lower return path section 30 is located backward relative to the main pole 15 in the direction of travel of the recording medium 90, and connects part of the main pole 15 located away from the medium facing surface 80 to the write shield 16, thereby magnetically coupling the main pole 15 to the write shield 16. The lower return path section 30 and the main pole 15 define a lower space LSP (see FIG. 7) for a portion of the coil to pass through.

The lower return path section 30 includes coupling portions 31, 32, 33, 34, and 35. The coupling portion 31 is disposed on the nonmagnetic layer 73. The coupling portions 32 and 33 are both disposed on the coupling portion 31. The coupling portion 32 is located near the medium facing surface 80. The coupling portion 33 is located farther from the medium facing surface 80 than the coupling portion 32. The coupling portions 31 and 32 have their respective end faces that face toward the medium facing surface 80 and that are each located at a distance from the medium facing surface 80.

As shown in FIG. 7, the lower coil portion 10 is wound around the coupling portion 33. The write head unit 9 further includes: an insulating layer 51 formed of an insulating material, disposed on the nonmagnetic layer 73 and surrounding the coupling portion 31; an insulating film 52 formed of an insulating material and isolating the lower coil portion 10 from the coupling portions 31 to 33; and an insulating layer 53 formed of an insulating material and disposed around the lower coil portion 10 and the coupling portion 32. The coupling portion 34 is embedded in the coupling portion 32 and the insulating layer 53. The coupling portion 34 has an end face located in the medium facing surface 80. The top surfaces of the lower coil portion 10, the coupling portions 32 to 34, the insulating film 52 and the insulating layer 53 are even with each other. The insulating layers 51 and 53 and the insulating film 52 are formed of alumina, for example.

The leading shield 16B lies on a part of the top surface of the coupling portion 34. The write head unit 9 further includes an insulating layer 54 formed of an insulating material. The insulating layer 54 lies on another part of the top surface of the coupling portion 34 and on the top surfaces of the lower coil portion 10, the coupling portions 32 and 33, the insulating film 52 and the insulating layer 53. The coupling portion 35 lies over the coupling portion 33 with the insulating layer 53 interposed therebetween. Note that the coupling portions 33 and 35 magnetically couple to each other even with the insulating layer 54 interposed between the coupling portions 33 and 35. The insulating layer 54 is formed of alumina, for example.

The write head unit 9 further includes a nonmagnetic layer 55 formed of a nonmagnetic material. The nonmagnetic layer 55 lies on the insulating layer 54 and surrounds the leading shield 16B and the coupling portion 35. The nonmagnetic layer 55 is formed of alumina or silicon oxide ($SiO_2$), for example.

The first and second side shields 16C and 16D are disposed on the leading shield 16B. The main pole 15 has the end face 15a, and also a top surface 15T (see FIG. 5) farthest from the top surface 1a of the substrate 1, a bottom end 15L (see FIG. 5) opposite to the top surface 15T, and a first side surface and a second side surface (see FIG. 6 to FIG. 8) opposite to each other in the track width direction (the X direction). As shown in FIG. 6, the first side shield 16C has a first sidewall opposed to a portion of the first side surface of the main pole 15, the portion being located near the medium facing surface 80. The second side shield 16D has a second sidewall opposed to a portion of the second side surface of the main pole 15, the portion being located near the medium facing surface 80.

The write head unit 9 further includes a first gap layer 18 formed of a nonmagnetic material. The first gap layer 18 is disposed to extend along the first and second sidewalls of the first and second side shields 16C and 16D, the top surface of the leading shield 16B, and the top surface of the nonmagnetic layer 55. An example of the nonmagnetic material used to form the first gap layer 18 is an insulating material such as alumina.

As shown in FIG. 5, the first gap layer 18 is interposed between a portion of the bottom end 15L of the main pole 15 and the top surfaces of the leading shield 16B and the nonmagnetic layer 55. As shown in FIG. 6, the first gap layer 18 is interposed also between the first side surface of the main pole 15 and the first sidewall of the first side shield 16C, and between the second side surface of the main pole 15 and the second sidewall of the second side shield 16D.

At a location apart from the medium facing surface 80, the bottom end 15L of the main pole 15 is in contact with the top surface of the coupling portion 35. The main pole 15 is formed of a ferromagnetic material containing one or more elements selected from Ni, Fe, and Co, such as FeNi, CoNiFe, or CoFe. The shape of the main pole 15 will be described in detail later.

The write head unit 9 further includes a first nonmagnetic layer (not shown) formed of a nonmagnetic material and disposed around the main pole 15 and the first and second side shields 16C and 16D. An example of the nonmagnetic material used to form the first nonmagnetic layer is an insulating material such as alumina.

The write head unit 9 further includes a nonmagnetic layer 61 and an insulating layer 62. The nonmagnetic layer 61 is formed of a nonmagnetic material and disposed on a first portion of the top surface 15T of the main pole 15 away from the medium facing surface 80. The insulating layer 62 is formed of an insulating material and disposed to cover the main pole 15 and the nonmagnetic layer 61 at a position away from the medium facing surface 80. The nonmagnetic layer 61 is formed of silicon oxide or alumina, for example. The insulating layer 62 is formed of alumina, for example.

Figure 1:
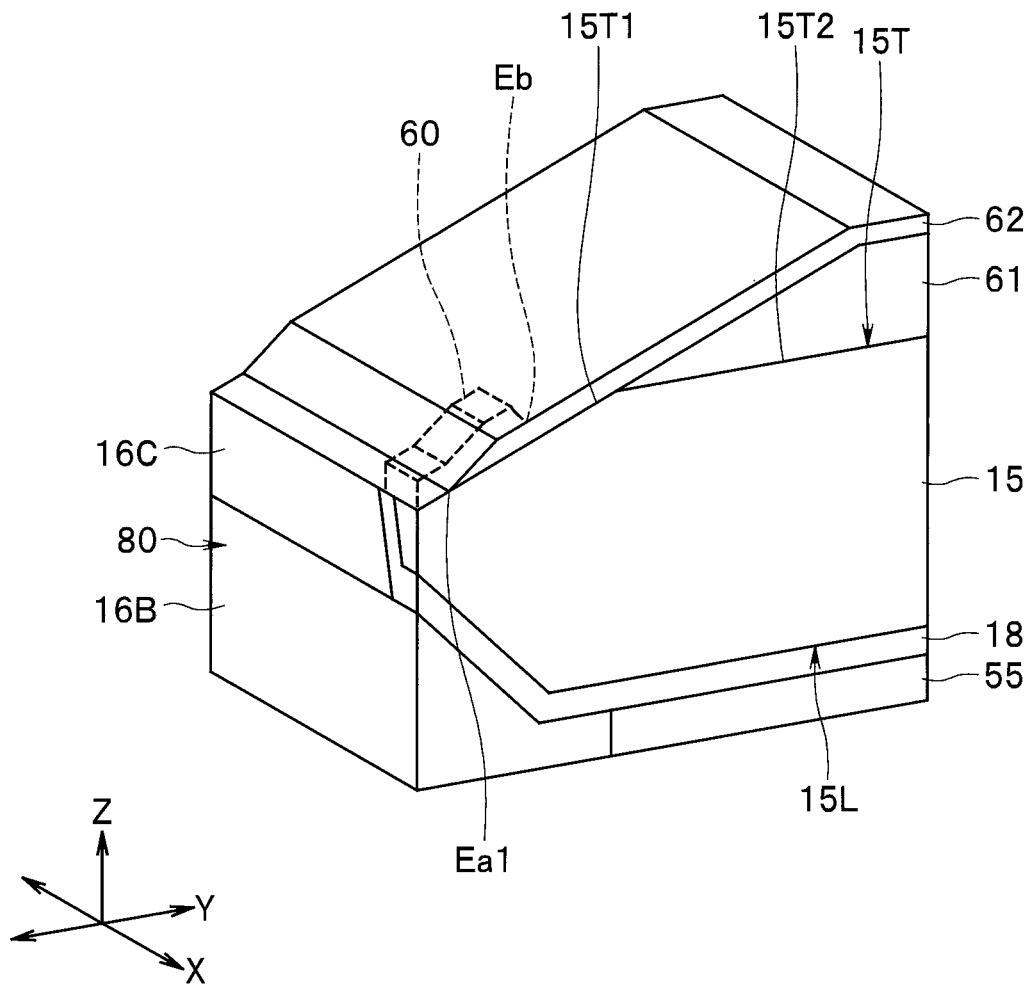
FIG. 1 is a perspective view showing essential parts of a magnetic head according to a first embodiment of the invention.
Figure 2:
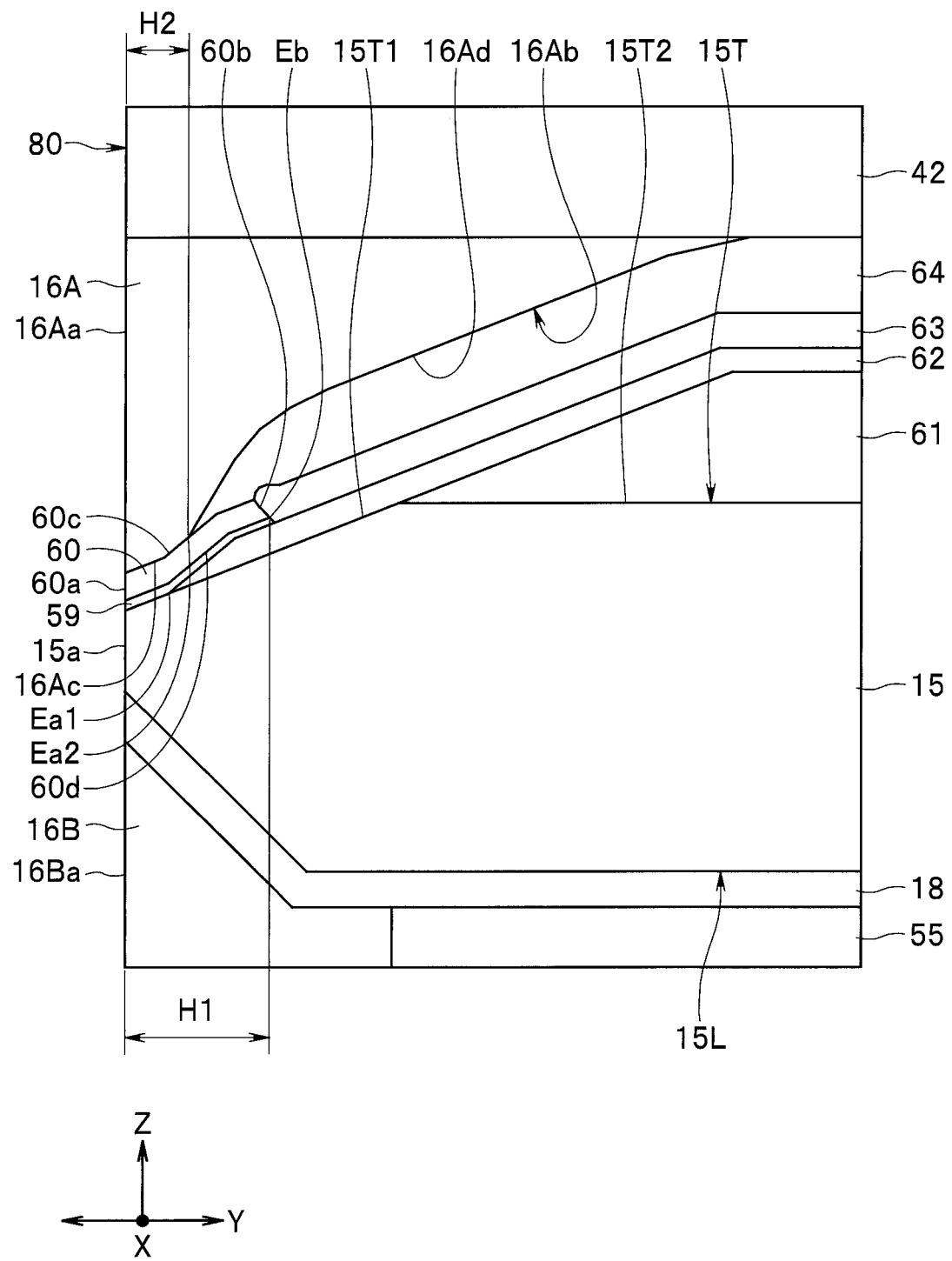
FIG. 2 is a cross-sectional view showing the essential parts of the magnetic head according to the first embodiment of the invention.

The write head unit 9 further includes a buffer layer 59 formed of a nonmagnetic conductive material. Note that the buffer layer 59 is shown in FIG. 1 and FIG. 2 to be described later. The buffer layer 59 is disposed on the main pole 15 and the insulating layer 62 near the medium facing surface 80, and in contact with the top surface 15T of the main pole 15. The spin torque oscillator 60 lies on the buffer layer 59. The buffer layer 59 is formed of, for example, one of Ta, Al, Ti, Mn, Ni, Zn, Zr, Nb, Mo, Ru, Rh, Pd, Ag, Hf, W, Ir, Pt, and Au, or an alloy composed of two or more of these elements.

The write head unit 9 further includes an insulating layer 63 and an insulating layer 64. The insulating layer 63 is formed of an insulating material and disposed on the insulating layer 62 at a position farther from the medium facing surface 80 than the buffer layer 59 and the spin torque oscillator 60 are. The insulating layer 64 is formed of an insulating material and disposed to cover a portion of the spin torque oscillator 60 and the insulating layer 63. The insulating layers 63 and 64 are formed of alumina, for example.

The write head unit 9 further includes a second gap layer 19 formed of a nonmagnetic material. As shown in FIG. 6, the second gap layer 19 includes a first portion 19A and a second portion 19B located on opposite sides of the buffer layer 59 and the spin torque oscillator 60 in the track width direction (the X direction). The first portion 19A lies on the first side shield 16C and the first gap layer 18. The second portion 19B lies on the second side shield 16D and the first gap layer 18. An example of the nonmagnetic material used to form the second gap layer 19 is an insulating material such as alumina.

The trailing shield 16A is disposed on the first and second side shields 16C and 16D, the second gap layer 19, the spin torque oscillator 60 and the insulating layer 64, and in contact with the top surfaces of the first and second side shields 16C and 16D, the second gap layer 19, the spin torque oscillator 60 and the insulating layer 64. In the medium facing surface 80, a portion of the front end face 16Aa of the trailing shield 16A is spaced a predetermined distance away from the end face 15a of the main pole 15. The predetermined distance is preferably in the range of 5 to 60 nm, and may be 30 to 60 nm, for example.

The upper return path section 40 includes coupling portions 41, 42, and 43. The coupling portion 41 lies on a second portion of the top surface 15T of the main pole 15, the second portion being located away from the medium facing surface 80. The second portion of the top surface 15T of the main pole 15 is located farther from the medium facing surface 80 than the first portion of the top surface 15T of the main pole 15. The coupling portion 42 is disposed on the trailing shield 16A. The coupling portion 42 has an end face located in the medium facing surface 80.

As shown in FIG. 8, the upper coil portion 20 is wound around the coupling portion 41. The write head unit 9 further includes: an insulating film 65 formed of an insulating material and isolating at least part of the upper coil portion 20 from the trailing shield 16A, the coupling portions 41 and 42 and the insulating layer 64; and a second nonmagnetic layer (not shown) formed of a nonmagnetic material and disposed around the trailing shield 16A, the upper coil portion 20, and the coupling portion 42. The insulating film 65 is formed of alumina, for example. An example of the nonmagnetic material used to form the second nonmagnetic layer is an insulating material such as alumina.

The write head unit 9 further includes an insulating layer 66 formed of an insulating material and disposed on the upper coil portion 20, the coupling portion 41 and the insulating film 65. The insulating layer 66 includes a first portion lying on the upper coil portion 20 and a second portion lying on the coupling portion 41. The second portion is smaller in maximum thickness (maximum dimension in the Z direction) than the first portion. The insulating layer 66 is formed of alumina, for example.

The coupling portion 43 is disposed on the coupling portion 42 and the insulating layer 66. The coupling portion 43 has an end face located in the medium facing surface 80. The coupling portion 43 includes a first portion lying on the coupling portion 42, a second portion lying over the coupling portion 41 with the insulating layer 66 interposed therebetween, and a third portion connecting the first and second portions. Note that the coupling portions 41 and 43 magnetically couple to each other even with the insulating layer 66 interposed between the coupling portion 41 and the second portion of the coupling portion 43.

The magnetic head 100 further includes a protective layer 70 formed of a nonmagnetic material and disposed to cover the write head unit 9. The protective layer 70 is formed of, e.g., an inorganic insulating material such as alumina.

As has been described, the magnetic head 100 according to the present embodiment includes the medium facing surface 80, the read head unit 8, and the write head unit 9. The read head unit 8 and the write head unit 9 are stacked on the substrate 1. The write head unit 9 is located forward relative to the read head unit 8 in the direction of travel of the recording medium 90 (the Z direction).

The write head unit 9 includes the coil including the upper coil portion 20 and the lower coil portion 10, the main pole 15, the write shield 16, the first gap layer 18, the second gap layer 19, the buffer layer 59, the spin torque oscillator 60, and the insulating layers 62 and 64. The coil, the main pole 15, the write shield 16, the first gap layer 18, the second gap layer 19, the buffer layer 59, the spin torque oscillator 60, and the insulating layers 62 and 64 are disposed above the top surface 1a of the substrate 1. The write shield 16 includes the trailing shield 16A, the leading shield 16B, and the first and second side shields 16C and 16D.

The write head unit 9 further includes the upper return path section 40 and the lower return path section 30. The upper return path section 40 includes the coupling portions 41, 42, and 43. The lower return path section 30 includes the coupling portions 31, 32, 33, 34, and 35.

The write shield 16 captures a disturbance magnetic field applied to the magnetic head 100 from outside the magnetic head 100. This makes it possible to prevent erroneous writing on the recording medium 90 that would be caused by the disturbance magnetic field being intensively captured into the main pole 15. The write shield 16 further has a function of capturing a magnetic flux that is generated from the end face 15a of the main pole 15 and spreads in directions other than the direction perpendicular to the plane of the recording medium 90, and thereby preventing the magnetic flux from reaching the recording medium 90. Furthermore, the write shield 16, the upper return path section 40 and the lower return path section 30 have a function of causing a magnetic flux that has been generated from the end face 15a of the main pole 15 and has magnetized a portion of the recording medium 90 to flow back.

The spin torque oscillator 60 is electrically connected to the main pole 15 and the trailing shield 16A. In the present embodiment, specifically, the spin torque oscillator 60 is electrically connected to the main pole 15 via the buffer layer 59. As shown in FIG. 5, the magnetic head 100 further includes: two terminals 81 and 82 connected to a power source (not shown); wiring 83 for electrically connecting the terminal 81 and the main pole 15; and wiring 84 for electrically connecting the terminal 82 and the coupling portion 43. The trailing shield 16A is electrically connected to the coupling portion 43 via the coupling portion 42. A current for operating the spin torque oscillator 60 (which will hereinafter be referred to as a driving current) is supplied via the terminals 81 and 82. The driving current flows through the main pole 15, the buffer layer 59, the spin torque oscillator 60, the trailing shield 16A, the coupling portion 42, and the coupling portion 43 in this order.

Figure 4:
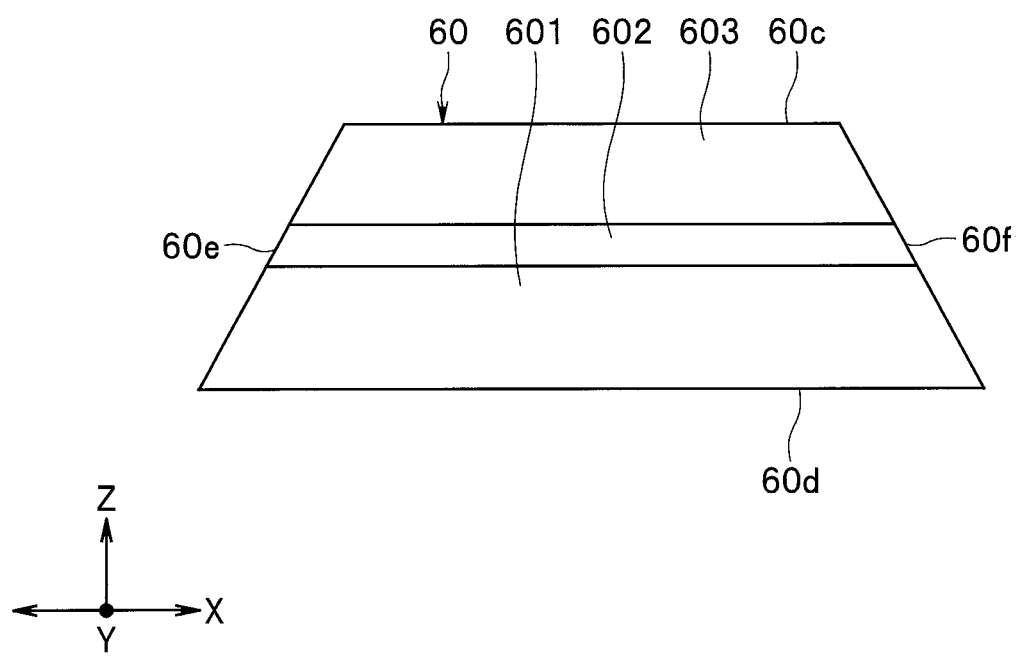
FIG. 4 is a front view showing a spin torque oscillator in the magnetic head according to the first embodiment of the invention.

Reference is now made to FIG. 4 to describe a configuration of the spin torque oscillator 60. FIG. 4 is a front view showing the spin torque oscillator 60. The spin torque oscillator 60 shown in FIG. 4 is one configured to generate a microwave magnetic field. This spin torque oscillator 60 includes a magnetic-field generating layer 601, a nonmagnetic layer 602, and a spin injection layer 603 stacked in this order, from closest to farthest from the buffer layer 59.

The magnetic-field generating layer 601 is formed of a material whose magnetization direction is parallel or almost parallel to the film plane when no driving current flows. The magnetic-field generating layer 601 may be a magnetic layer formed of one of FeCo, FeCoAl, FeCoSi, FeCoB, and FeNi, a layered film composed of alternately stacked layers of FeCo and Ni, or a layered film composed of alternately stacked layers of Fe and Co.

The nonmagnetic layer 602 is formed of a material having high spin permeability. The nonmagnetic layer 602 may be a nonmagnetic metal layer formed of one of Ag, Au, Cr, and Al, or a tunnel barrier layer formed of MgO or $Al_2O_3$.

The spin injection layer 603 is formed of a material having magnetic anisotropy in a direction perpendicular to the film plane. The spin injection layer 603 may be a layered film composed of alternately stacked layers of CoFe and Ni, a layered film composed of alternately stacked layers of Co and Pt, a layered film composed of alternately stacked layers of Co and Pd, or an alloy layer formed of one of CoPt, FePt, and MnGa.

The spin torque oscillator 60 may further include a protective layer disposed on the spin injection layer 603. The protective layer is formed of a nonmagnetic metal material. For example, the protective layer is formed of one of Ta, Al, Ti, Mn, Fe, Co, Ni, Cu, Zn, Zr, Nb, Mo, Ru, Rh, Pd, Ag, Hf, W, Ir, Pt, and Au, or an alloy composed of two or more of these elements.

In the spin torque oscillator 60 shown in FIG. 4, passing a driving current in the direction from the magnetic-field generating layer 601 to the spin injection layer 603 imparts a spin torque to the magnetization of the magnetic-field generating layer 601 to cause precession of the magnetization of the magnetic-field generating layer 601. As a result, a microwave magnetic field is generated from the magnetic-field generating layer 601.

Reference is now made to FIG. 7 and FIG. 8 to describe the connection relationship between the upper coil portion 20 and the lower coil portion 10 of the coil. As shown in FIG. 7, the lower coil portion 10 has a coil connection 10E electrically connected to the upper coil portion 20. As shown in FIG. 8, the upper coil portion 20 has a coil connection 20S electrically connected to the coil connection 10E of the lower coil portion 10. The coil connection 20S is electrically connected to the coil connection 10E via a first and a second connection layer of columnar shape (not shown) that penetrate a plurality of layers interposed between the upper coil portion 20 and the lower coil portion 10. The first and second connection layers are stacked in this order on the coil connection 10E. The coil connection 20S lies on the second connection layer. The first and second connection layers are formed of a conductive material such as copper. In the example shown in FIG. 7 and FIG. 8, the upper coil portion 20 and the lower coil portion 10 are connected in series.

Figure 3:
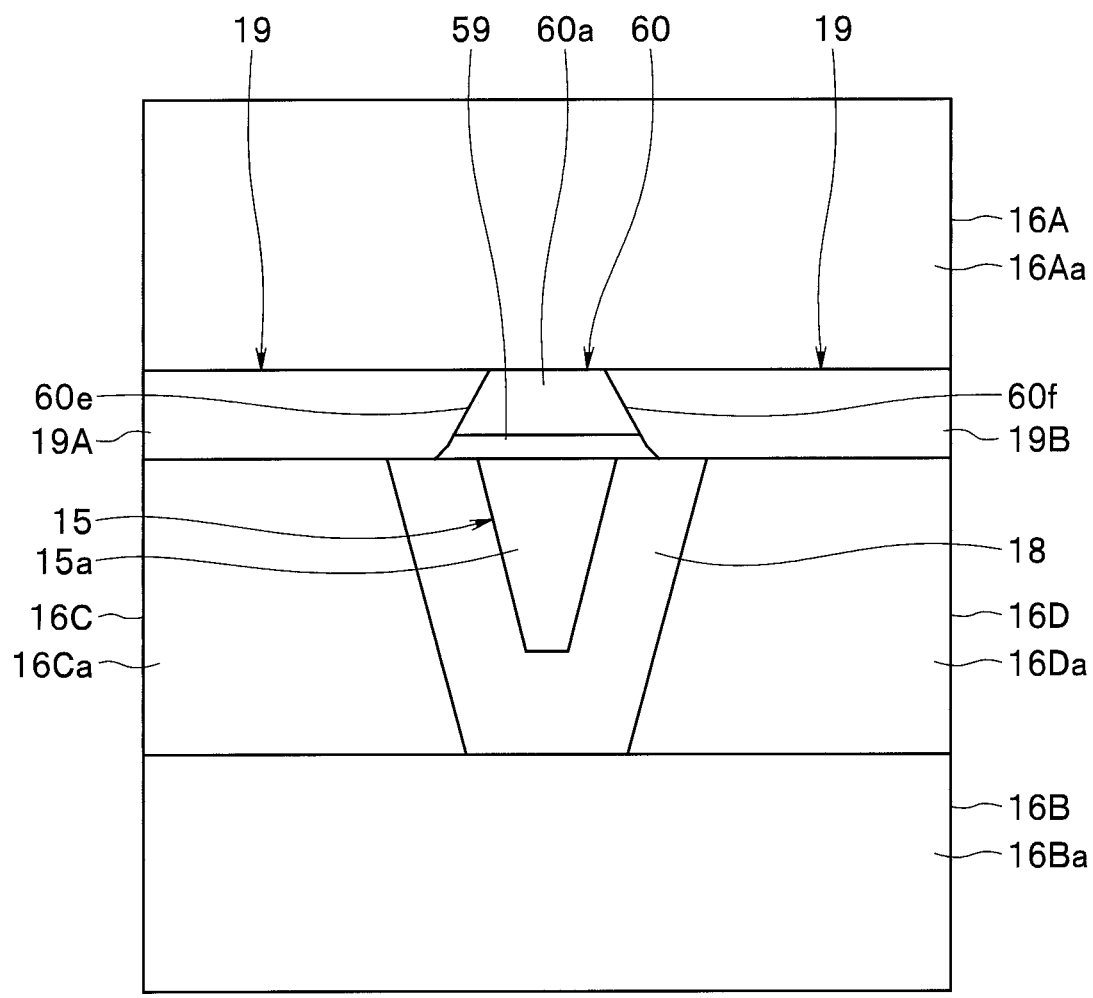
FIG. 3 is a front view showing the essential parts of the magnetic head according to the first embodiment of the invention.

Now, the shape of the main pole 15 will be described in detail with reference to FIG. 1 to FIG. 3, FIG. 5, FIG. 7, and FIG. 8. FIG. 1 is a perspective view showing essential parts of the magnetic head 100. FIG. 2 is a cross-sectional view showing the essential parts of the magnetic head 100. FIG. 3 is a front view showing the essential parts of the magnetic head 100.

As shown in FIG. 7 and FIG. 8, the main pole 15 includes a track width defining portion 15A having the end face 15a and an end opposite thereto, and a wide portion 15B connected to the end of the track width defining portion 15A. The main pole 15 has the top surface 15T, the bottom end 15L, the first side surface and the second side surface. Hereinafter, a width in the track width direction (the X direction) will be simply referred to as a width. The width of the top surface 15T is greater in the wide portion 15B than in the track width defining portion 15A. The width of the top surface 15T in the track width defining portion 15A gradually increases with increasing distance from the medium facing surface 80, and then becomes constant.

As shown in FIG. 1 and FIG. 2, the top surface 15T includes an inclined portion 15T1 and a flat portion 15T2, the inclined portion 15T1 being closer to the medium facing surface 80 than the flat portion 15T2. The inclined portion 15T1 has a first end closest to the medium facing surface 80 and a second end opposite thereto. The flat portion 15T2 is connected to the second end of the inclined portion 15T1. The inclined portion 15T1 is inclined such that the second end is located forward relative to the first end in the direction of travel of the recording medium 90 (the Z direction). The flat portion 15T2 extends substantially in a direction perpendicular to the medium facing surface 80 (the Y direction).

As shown in FIG. 2, the bottom end 15L includes a first inclined portion and a first flat portion, the first inclined portion being closer to the medium facing surface 80 than the first flat portion. The first inclined portion has a third end located in the medium facing surface 80, and a fourth end opposite thereto. The first inclined portion may be an edge formed by two intersecting surfaces, or may be a surface connecting two surfaces to each other. The first flat portion is a surface connected to the fourth end of the first inclined portion. The first inclined portion is inclined such that the fourth end is located backward relative to the third end in the direction of travel of the recording medium 90 (the Z direction). The first flat portion extends substantially in a direction perpendicular to the medium facing surface 80 (the Y direction).

As shown in FIG. 5, the bottom end 15L further includes a second inclined portion and a second flat portion. The second inclined portion is a surface connected to an end of the first flat portion opposite from the first inclined portion. The second flat portion is a surface connected to an end of the second inclined portion opposite from the first flat portion. The second inclined portion is inclined in a manner similar to that in which the first inclined portion is inclined. The second flat portion extends substantially in a direction perpendicular to the medium facing surface 80 (the Y direction), like the first flat portion.

As shown in FIG. 3, the end face 15a of the main pole 15 has a top edge farthest from the top surface 1a of the substrate 1, a first side edge connected to one end of the top edge, and a second side edge connected to the other end of the top edge. In the present embodiment, specifically, the top edge is in contact with the buffer layer 59. The top edge defines the track width. The position of an end of a recording bit to be recorded on the recording medium 90 is determined by the position of the top edge. The width in the track width direction of the end face 15a of the main pole 15 decreases with increasing distance from the top edge, i.e., with decreasing distance to the top surface 1a of the substrate 1. Each of the first side edge and the second side edge forms an angle in the range of, for example, 7° to 17°, preferably 10° to 15°, with respect to a direction perpendicular to the top surface 1a of the substrate 1. The top edge has a length in the range of 0.05 to 0.20 μm, for example.

Next, the shapes and positions of the trailing shield 16A, the spin torque oscillator 60, and the insulating layers 62 and 64 will be described in detail with reference to FIG. 1 to FIG. 4. As shown in FIG. 1 to FIG. 4, the spin torque oscillator 60 has a front end face 60a facing the medium facing surface 80, a rear end face 60b farthest from the medium facing surface 80, a top surface 60c farthest from the top surface 1a of the substrate 1, a bottom surface 60d closest to the top surface 1a of the substrate 1, and a first side surface 60e and a second side surface 60f opposite to each other in the track width direction (the X direction). In the present embodiment, specifically, the front end face 60a is located in the medium facing surface 80.

The top surface 60c is in contact with the trailing shield 16A. The bottom surface 60d is in contact with the buffer layer 59. The first and second side surfaces 60e and 60f are oblique to the top surface 1a (see FIG. 5 and FIG. 6) of the substrate 1. The distance between the first side surface 60e and the second side surface 60f decreases with increasing distance from the top surface 1a of the substrate 1.

The spin torque oscillator 60 further has a rear end Eb farthest from the medium facing surface 80. The rear end Eb also serves as a border between the rear end face 60b and the bottom surface 60d.

The insulating layer 62 will hereinafter be also referred to as a first insulating layer 62, and the insulating layer 64 a second insulating layer 64. The first insulating layer 62 is interposed between a portion of the main pole 15 and a portion of the spin torque oscillator 60. The buffer layer 59 is interposed between the first insulating layer 62 and the spin torque oscillator 60. The buffer layer 59 and the first insulating layer 62 are in contact with the inclined portion 15T1 of the top surface 15T of the main pole 15.

The first insulating layer 62 has a first end Ea1 closest to the medium facing surface 80. The first end Ea1 of the first insulating layer 62 is located closer to the medium facing surface 80 than the rear end Eb of the spin torque oscillator 60 is.

The second insulating layer 64 is interposed between a portion of the trailing shield 16A and a portion of the spin torque oscillator 60. The second insulating layer 64 has a second end Ea2 closest to the medium facing surface 80. The second end Ea2 of the second insulating layer 64 is located closer to the medium facing surface 80 than the rear end Eb of the spin torque oscillator 60 is. The second insulating layer 64 has a thickness in the range of 20 to 100 nm, for example.

As shown in FIG. 2, the first end Ea1 of the first insulating layer 62 is located closer to the medium facing surface 80 than the second end Ea2 of the second insulating layer 64 is. The distance from the medium facing surface 80 to the first end Ea1 is in the range of 10 to 30 nm, for example. The distance from the medium facing surface 80 to the second end Ea2 is in the range of 10 to 35 nm, for example.

The trailing shield 16A has a bottom surface 16Ab facing toward the main pole 15. The bottom surface 16Ab of the trailing shield 16A includes a first portion 16Ac and a second portion 16Ad. The first portion 16Ac has an end located in the medium facing surface 80 and is in contact with the spin torque oscillator 60 at least in part. The second portion 16Ad is connected to the first portion 16Ac at a position away from the medium facing surface 80. The first portion 16Ac extends along the inclined portion 15T1 of the top surface 15T of the main pole 15. The distance between the first portion 16Ac and the main pole 15 is constant or near constant regardless of the distance from the medium facing surface 80. The distance between the second portion 16Ad and the main pole 15 is a minimum at the border between the first and second portions 16Ac and 16Ad, and a maximum at a position away from the border.

As shown in FIG. 2, the dimension of the spin torque oscillator 60 in the direction perpendicular to the medium facing surface 80 (Y direction) will be referred to as an element height and denoted by the symbol H1. The dimension of the first portion 16Ac in the direction perpendicular to the medium facing surface 80 will be referred to as a writer height and denoted by the symbol H2. The element height H1 and the writer height H2 are different from each other. In particular, in the present embodiment, the element height H1 is greater than the writer height H2. The element height H1 is preferably in the range of 40 to 100 nm, more preferably in the range of 40 to 70 nm. The writer height H2 is preferably in the range of 10 to 35 nm.

The second end Ea2 of the second insulating layer 64 is located near the border between the first portion 16Ac and the second portion 16Ad of the bottom surface 16Ab of the trailing shield 16A. The writer height H2 is the same or substantially the same as the distance from the medium facing surface 80 to the second end Ea2. The second portion 16Ad is in contact with the second insulating layer 64. The first portion 16Ac is in contact with the spin torque oscillator 60 but not with the second insulating layer 64. No portion of the second insulating layer 64 lies between the first portion 16Ac and the spin torque oscillator 60.

Next, a function and effects specific to the magnetic head 100 according to the present embodiment will be described. To suppress the heat generation of the spin torque oscillator 60 due to the driving current, the element height H1 is preferably large to some extent. However, increasing the element height H1 lowers the current density in the spin torque oscillator 60. This causes a problem that the function of the spin torque oscillator 60 is not fully exerted. If the element height H1 is increased and the voltage to be applied to the spin torque oscillator 60 is increased to increase the current density, there arises a problem that the heat generation of the spin torque oscillator 60 fails to be sufficiently suppressed.

By contrast, in the present embodiment, the first insulating layer 62 is interposed between a portion of the main pole 15 and a portion of the spin torque oscillator 60. The first end Ea1 of the first insulating layer 62 is located closer to the medium facing surface 80 than the rear end Eb of the spin torque oscillator 60 is. In the present embodiment, the driving current flowing through the spin torque oscillator 60 therefore passes between the medium facing surface 80 and the first end Ea1. As a result, according to the present embodiment, the current density in the portion of the spin torque oscillator 60 located closer to the medium facing surface 80 than the first end Ea1 can be increased. According to the present embodiment, the current density can thus be increased by the first insulating layer 62 without increasing the voltage to be applied to the spin torque oscillator 60.

In the present embodiment, the first insulating layer 62 can also make the area where the current density is high in the spin torque oscillator 60 closer to the medium facing surface 80. According to the present embodiment, a microwave magnetic field can thus be generated at a position closer to the medium facing surface 80. According to the present embodiment, the function of the spin torque oscillator 60 can thus be effectively exerted.

In the present embodiment, the element height H1 can be freely set regardless of the position of the first end Ea1. According to the present embodiment, the element height H1 can thus be increased to suppress an increase in the temperature of the spin torque oscillator 60.

In consequence, according to the present embodiment, the function of the spin torque oscillator 60 can be fully exerted while the heat generation of the spin torque oscillator 60 is suppressed.

Moreover, in the present embodiment, the second insulating layer 64 is interposed between a portion of the trailing shield 16A and a portion of the spin torque oscillator 60. The second end Ea2 of the second insulating layer 64 is located closer to the medium facing surface 80 than the rear end Eb of the spin torque oscillator 60 is. In the present embodiment, the driving current flowing through the spin torque oscillator 60 therefore passes between the medium facing surface 80 and the second end Ea2. As a result, according to the present embodiment, the current density in the portion of the spin torque oscillator 60 located closer to the medium facing surface 80 than the second end Ea2 can be increased. According to the present embodiment, the current density can thus be increased by the second insulating layer 64 as well without increasing the voltage to be applied to the spin torque oscillator 60.

The greater the writer height H2, the more magnetic flux leaks from the main pole 15 to the trailing shield 16A. This causes a problem of degradation in recording characteristics such as an overwrite characteristic. On the other hand, the smaller the writer height H2, the more likely the trailing shield 16A is to be saturated with the magnetic flux. This results in a problem that the magnetic flux leaks from the front end face 16Aa of the trailing shield 16A to the recording medium 90. To prevent the occurrence of such problems, there is a preferable size for the writer height H2. Without the second insulating layer 64, the writer height H2 is the same or substantially the same as the element height H1. However, the size of the element height H1 set in view of suppressing the temperature increase of the spin torque oscillator 60 is not necessarily the same as the preferable size of the writer height H2. The absence of the second insulating layer 64 thus causes a problem of degradation in the recording characteristics.

By contrast, the present embodiment includes the second insulating layer 64, and the element height H1 and the writer height H2 are made different from each other. According to the present embodiment, the problem arising from the element height H1 and the writer height H2 being the same can thus be avoided. Moreover, according to the present embodiment, the temperature increase of the spin torque oscillator 60 can be suppressed and the recording characteristics can be improved as well by setting the element height H1 and the writer height H2 to respective preferable sizes.

Next, a manufacturing method for the magnetic head 100 according to the present embodiment will be described. The manufacturing method for the magnetic head 100 according to the present embodiment starts with forming the insulating layer 2, the first read shield layer 3, and the MR element 5 in this order on the substrate 1, as shown in FIG. 5 and FIG. 6. Next, the insulating layer 6 is formed around the MR element 5. The second read shield layer 7, the nonmagnetic layer 71, the middle shield layer 72, and the nonmagnetic layer 73 are then formed in this order over the MR element 5 and the insulating layer 6.

Next, the coupling portion 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the coupling portion 31 is exposed. Next, the coupling portions 32 and 33 are formed on the coupling portion 31 by frame plating, for example. The insulating film 52 is then formed over the entire top surface of the stack. Next, the lower coil portion 10 is formed by frame plating, for example. The insulating layer 53 is then formed over the entire top surface of the stack.

The insulating film 52 and the insulating layer 53 are then polished by, for example, CMP, until the lower coil portion 10 and the coupling portions 32 and 33 are exposed.

Next, the coupling portion 32 and the insulating layer 53 are etched to form therein an accommodation part to accommodate the coupling portion 34. Then, the coupling portion 34 is formed to be accommodated in the accommodation part. The insulating layer 54 is then formed over the entire top surface of the stack. Next, the insulating layer 54 is selectively etched to form therein a first opening for exposing the top surface of the coupling portion 34 and a second opening for exposing the coil connection 10E (see FIG. 7) of the lower coil portion 10. Then, the leading shield 16B is formed on the coupling portion 34 at the position of the first opening, the coupling portion 35 is formed on a portion of the insulating layer 54 covering the top surface of the coupling portion 33, and the first connection layer (not shown) is formed on the coil connection 10E at the position of the second opening, by performing frame plating, for example.

Next, the nonmagnetic layer 55 is formed over the entire top surface of the stack. The nonmagnetic layer 55 is then polished by, for example, CMP, until the leading shield 16B, the coupling portion 35 and the first connection layer are exposed. Then, the leading shield 16B and the nonmagnetic layer 55 are taper-etched in part by, for example, ion beam etching (hereinafter referred to as IBE) so as to provide the top surface of the leading shield 16B with a portion to be opposed to the first inclined portion (see FIG. 2) of the bottom end 15L of the main pole 15 to be formed later, and provide the top surface of the nonmagnetic layer 55 with a portion to be opposed to the second inclined portion (see FIG. 5) of the bottom end 15L of the main pole 15 to be formed later. The coupling portion 35 and the first connection layer are also etched in part by this etching.

Next, the first and second side shields 16C and 16D are formed on the leading shield 16B by, for example, frame plating. The first gap layer 18 is then formed to cover the leading shield 16B and the first and second side shields 16C and 16D. In the case of using alumina as the material of the first gap layer 18, the first gap layer 18 is formed by atomic layer deposition (herein after referred to as ALD), for example. The first gap layer 18 is then selectively etched to form therein an opening for exposing the top surface of the coupling portion 35, and an opening for exposing the top surface of the first connection layer. Next, an initial main pole, which becomes the main pole 15 later, and the second connection layer (not shown) are formed by frame plating, for example. The initial main pole and the second connection layer are formed such that their top surfaces are higher in level than portions of the first gap layer 18 that are located on the first and second side shields 16C and 16D.

Next, the first nonmagnetic layer (not shown) is formed over the entire top surface of the stack. The initial main pole, the second connection layer, the first gap layer 18, and the first nonmagnetic layer are then polished by, for example, CMP until the first and second side shields 16C and 16D are exposed.

Reference is now made to FIG. 9 to FIG. 16 to describe a series of steps to be performed after the foregoing step up to the formation of the trailing shield 16A. FIG. 9 to FIG. 16 each show a stack of layers formed in the process of manufacturing the magnetic head 100. FIG. 9 to FIG. 16 show, on an enlarged scale, the stack near a position where the medium facing surface 80 is to be formed. FIG. 9 to FIG. 16 each show a cross section perpendicular to the medium facing surface 80 and the top surface 1a of the substrate 1.

In FIG. 9 to FIG. 16, the symbol ABS represents the position where the medium facing surface 80 is to be formed.

Figure 9:
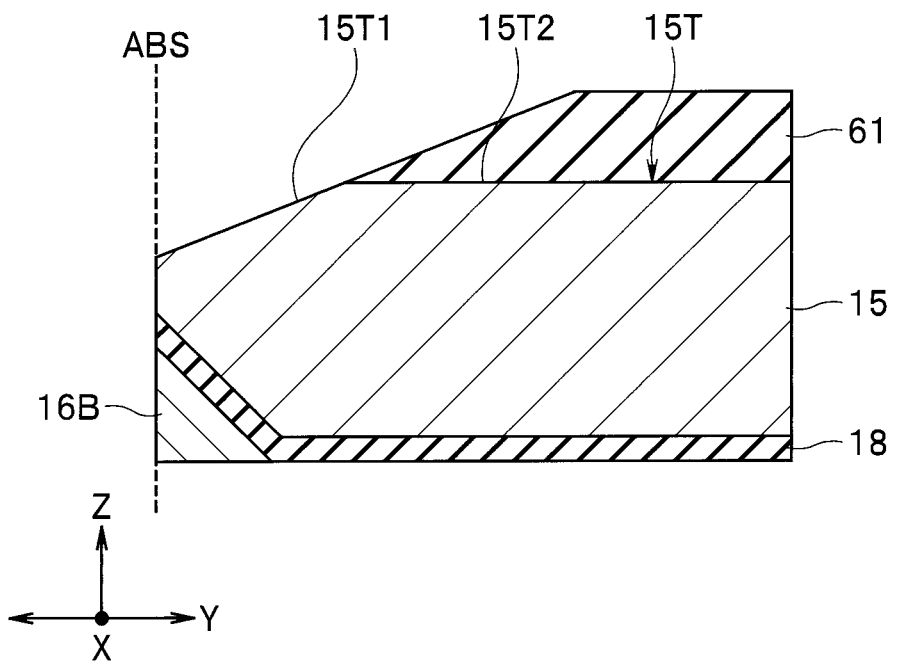
FIG. 9 is a cross-sectional view showing a step of a manufacturing method for the magnetic head according to the first embodiment of the invention.

FIG. 9 shows a step after the initial main pole, the second connection layer, the first gap layer 18, and the first nonmagnetic layer are polished. In this step, the nonmagnetic layer 61 is initially formed on the initial main pole. The initial main pole and the nonmagnetic layer 61 are then taper-etched by, for example, IBE so as to provide the initial main pole with the inclined portion 15T1 of the top surface 15T of the main pole 15. This makes the initial main pole into the main pole 15. The first and second side shields 16C and 16D, the first gap layer 18, and the first nonmagnetic layer are also etched in part by this etching.

Figure 10:
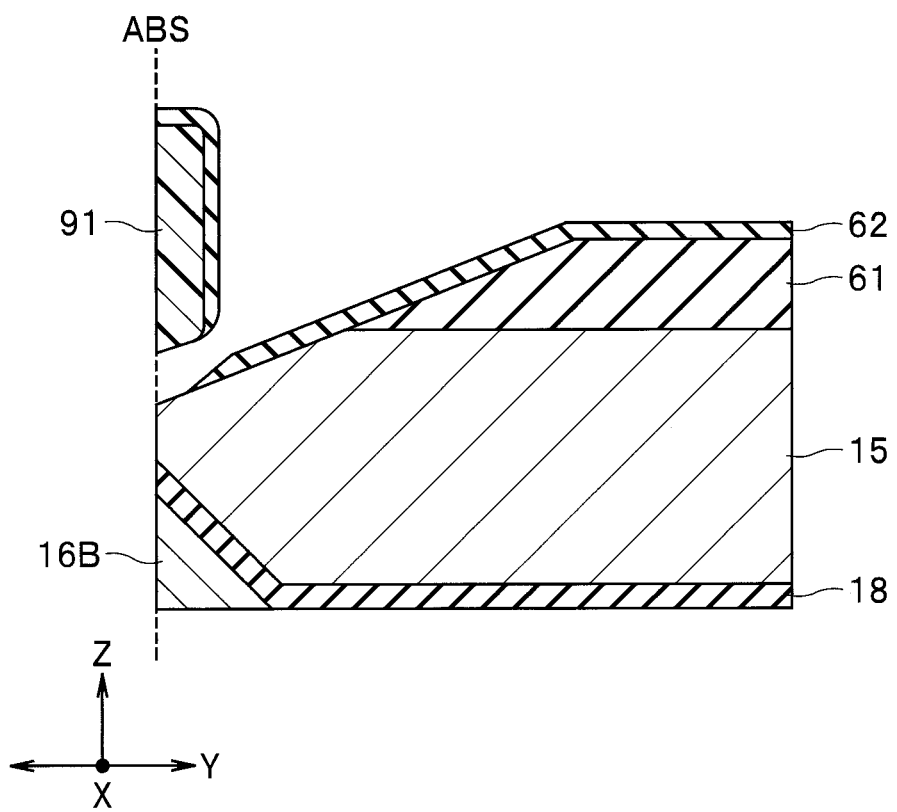
FIG. 10 is a cross-sectional view showing a step that follows the step shown in FIG. 9.

FIG. 10 shows the next step. In this step, first, a mask 91 is formed on the stack. The mask 91 includes a lower layer and an upper layer lying on the lower layer. The upper layer is formed of a photoresist patterned by photolithography. The lower layer is formed of, for example, a material that dissolves in a developing solution used in patterning the upper layer. When the upper layer is patterned, a portion of the lower layer located in and near a cross section taken at the position where the medium facing surface 80 is to be formed is removed. As a result, as shown in FIG. 10, a gap develops between the main pole 15 and the mask 91 in the cross section taken at the position where the medium facing surface 80 is to be formed. Note that even if the foregoing portion of the lower layer is removed, the mask 91 will not peel away since the lower layer remains between the stack and the upper layer except in and near the cross section taken at the position where the medium facing surface 80 is to be formed.

Next, the insulating layer 62 is formed over the entire top surface of the stack. The mask 91 is then lifted off.

Figure 11:
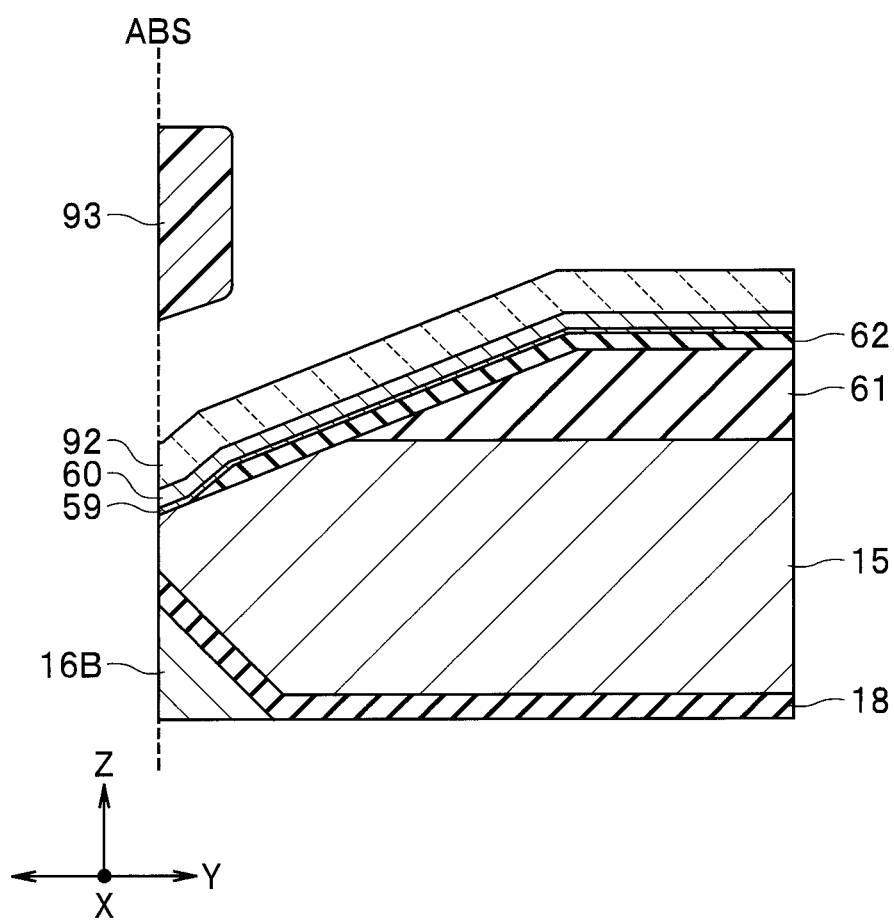
FIG. 11 is a cross-sectional view showing a step that follows the step shown in FIG. 10.

FIG. 11 shows the next step. In this step, first, the buffer layer 59 is formed on the stack including the main pole 15 and the insulating layer 62. Next, a layered film 60P, which becomes the spin torque oscillator 60 later, is formed on the buffer layer 59. As in the example shown in FIG. 4, the spin torque oscillator 60 is composed of a plurality of layers. The layered film 60P includes all the layers to constitute the spin torque oscillator 60.

In the step shown in FIG. 11, the layered film 60P and the buffer layer 59 each are then etched in part so that the first and second side surfaces 60e and 60f of the spin torque oscillator 60 are formed on the layered film 60P. Next, the second gap layer 19 is formed on the first gap layer 18 and the first and second side shields 16C and 16D (see FIG. 3 and FIG. 6).

Next, a protective layer 92 is formed on the layered film 60P. The protective layer 92 is what is called a hard mask, and is formed of an inorganic material. In the present embodiment, specifically, the protective layer 92 is formed of carbon. Next, a mask 93 is formed on the protective layer 92. The mask 93 has the same configuration as that of the mask 91.

Figure 12:
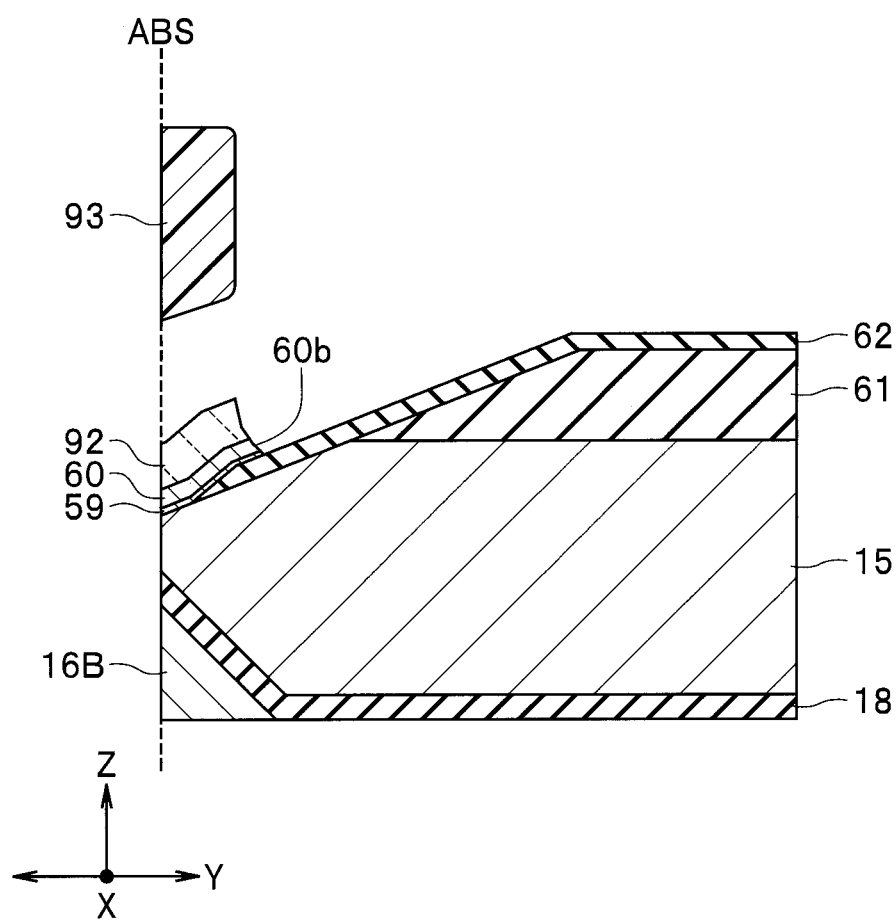
FIG. 12 is a cross-sectional view showing a step that follows the step shown in FIG. 11.

FIG. 12 shows the next step. In this step, first, the protective layer 92 is etched in part by using the mask 93. This etching is performed by reactive ion etching (hereinafter referred to as RIE). In the case where the protective layer 92 is formed of carbon, a gas containing $O_2$ is used as an etching gas.

Next, the layered film 60P is etched to form the rear end face 60b of the spin torque oscillator 60 on the layered film 60P by, e.g., IBE, using the mask 93 and the protective layer 92 as an etching mask. This makes the layered film 60P into the spin torque oscillator 60. The etching of the layered film 60P is followed by etching of the buffer layer 59 until the insulating layer 62 is exposed. The etching of the buffer layer 59 removes the portion of the buffer layer 59 not covered with the spin torque oscillator 60.

Figure 13:
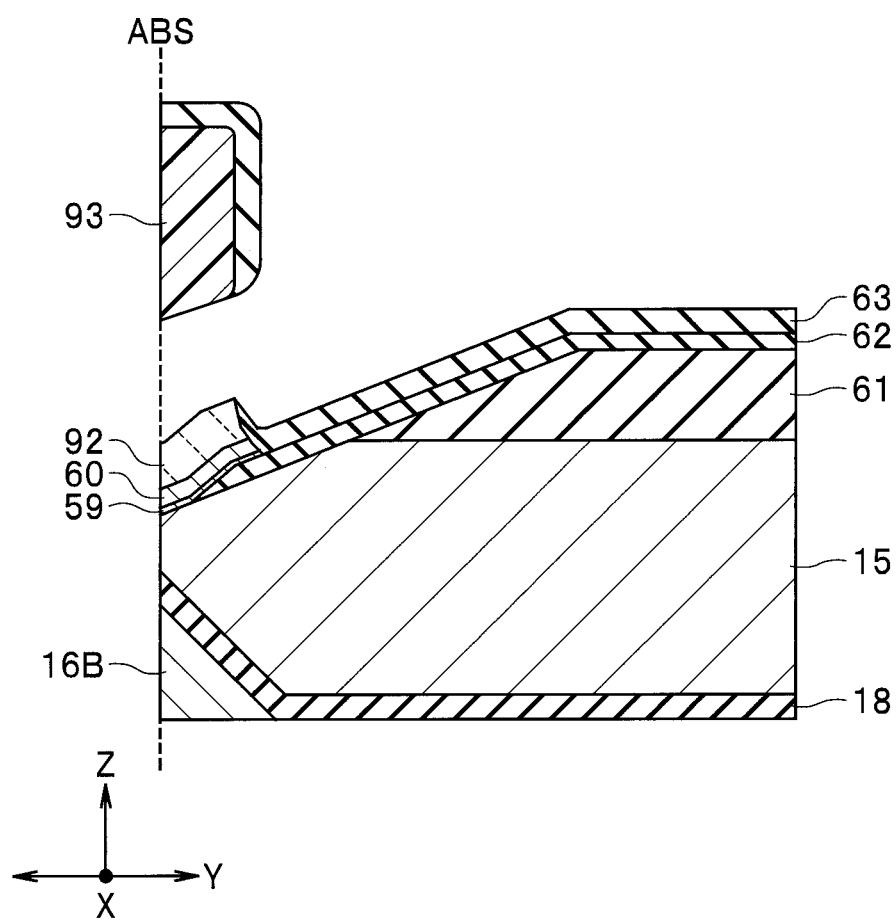
FIG. 13 is a cross-sectional view showing a step that follows the step shown in FIG. 12.

FIG. 13 shows the next step. In this step, the insulating layer 63 is formed over the entire top surface of the stack with the mask 93 left intact. The mask 93 is then lifted off.

Figure 14:
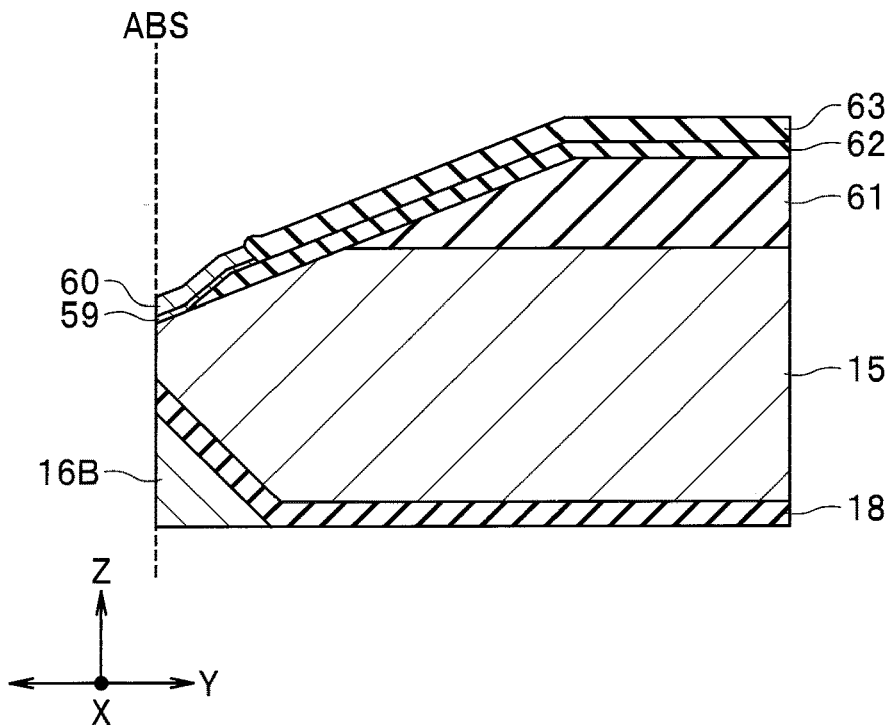
FIG. 14 is a cross-sectional view showing a step that follows the step shown in FIG. 13.

FIG. 14 shows the next step. In this step, the protective layer 92 is removed. In the case where the protective layer 92 is formed of carbon, the protective layer 92 is removed by ashing, for example.

Figure 15:
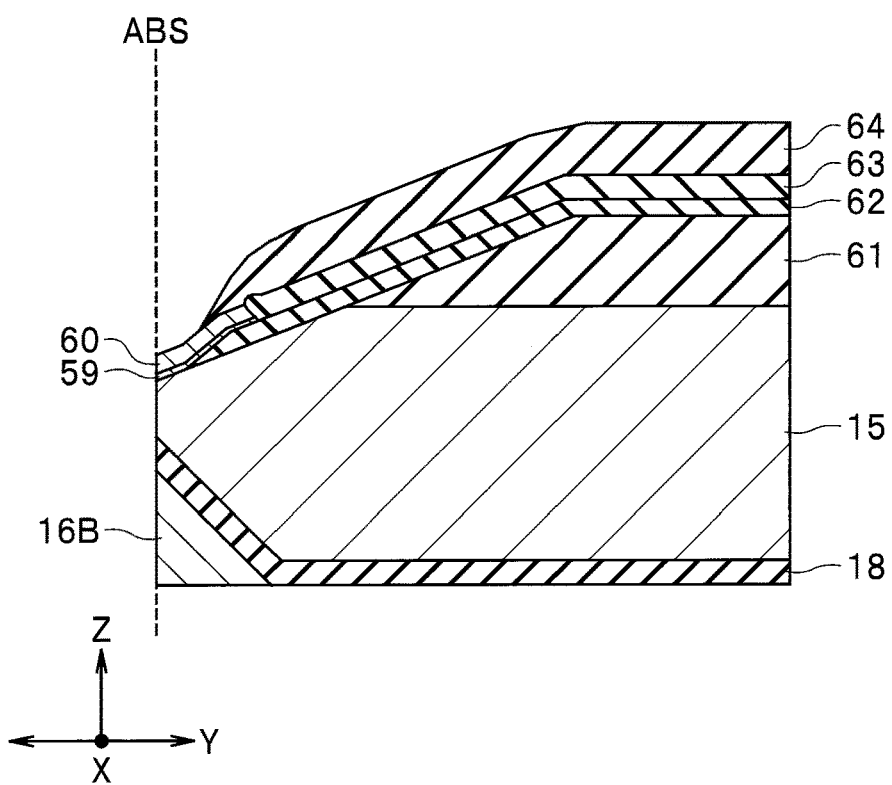
FIG. 15 is a cross-sectional view showing a step that follows the step shown in FIG. 14.

FIG. 15 shows the next step. In this step, the insulating layer 64 is formed by a lift-off method, for example.

Figure 16:
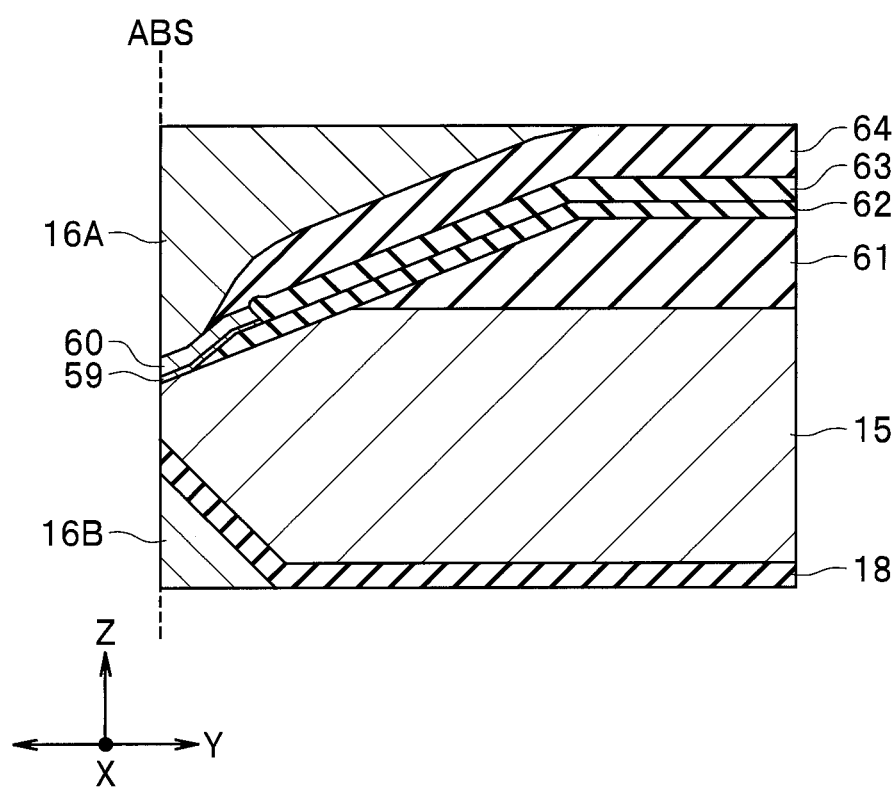
FIG. 16 is a cross-sectional view showing a step that follows the step shown in FIG. 15.

FIG. 16 shows the next step. In this step, first, the second gap layer 19 is selectively etched so that the top surfaces of the first and second side shields 16C and 16D are exposed in part. Next, the trailing shield 16A is formed over the first and second side shields 16C and 16D, the second gap layer 19, the spin torque oscillator 60 and the insulating layer 64 by frame plating, for example.

Steps following the formation of the trailing shield 16A will be described below with reference to FIG. 5 and FIG. 6. First, the nonmagnetic layer 61 and the insulating layers 62 to 64 are selectively etched by, for example, IBE so that the second portion of the top surface 15T of the main pole 15 is exposed. Then, the coupling portion 41 is formed on the main pole 15 and the coupling portion 42 is formed on the trailing shield 16A by, for example, frame plating. Next, the insulating film 65 is formed over the entire top surface of the stack.

The insulating film 65 is then selectively etched to form therein an opening for exposing the top surface of the second connection layer. Next, the upper coil portion 20 is formed by frame plating, for example. The second nonmagnetic layer (not shown) is then formed over the entire top surface of the stack. The insulating film 65 and the second nonmagnetic layer are then polished by, for example, CMP, until the upper coil portion 20 and the coupling portions 41 and 42 are exposed.

Next, the insulating layer 66 is formed over the entire top surface of the stack. Then, the insulating layer 66 is selectively etched to form therein an opening for exposing the top surface of the coupling portion 42, and the top surface of a portion of the insulating layer 66 covering the top surface of the coupling portion 41 is also etched. The coupling portion 43 is then formed by frame plating, for example. Next, the protective layer 70 is formed over the entire top surface of the stack. For example, the step of forming the wirings 83 and 84 is performed simultaneously with a series of steps from the step of forming the main pole 15 to the step of forming the protective layer 70.

Next, wiring and a plurality of terminals including the terminals 81 and 82 are formed on the protective layer 70, and the substrate 1 is cut near the position ABS where the medium facing surface 80 is to be formed. The cut surface is then polished into the medium facing surface 80, and further processes such as fabrication of flying rails are performed to complete the magnetic head 100.

Second Embodiment

Figure 17:
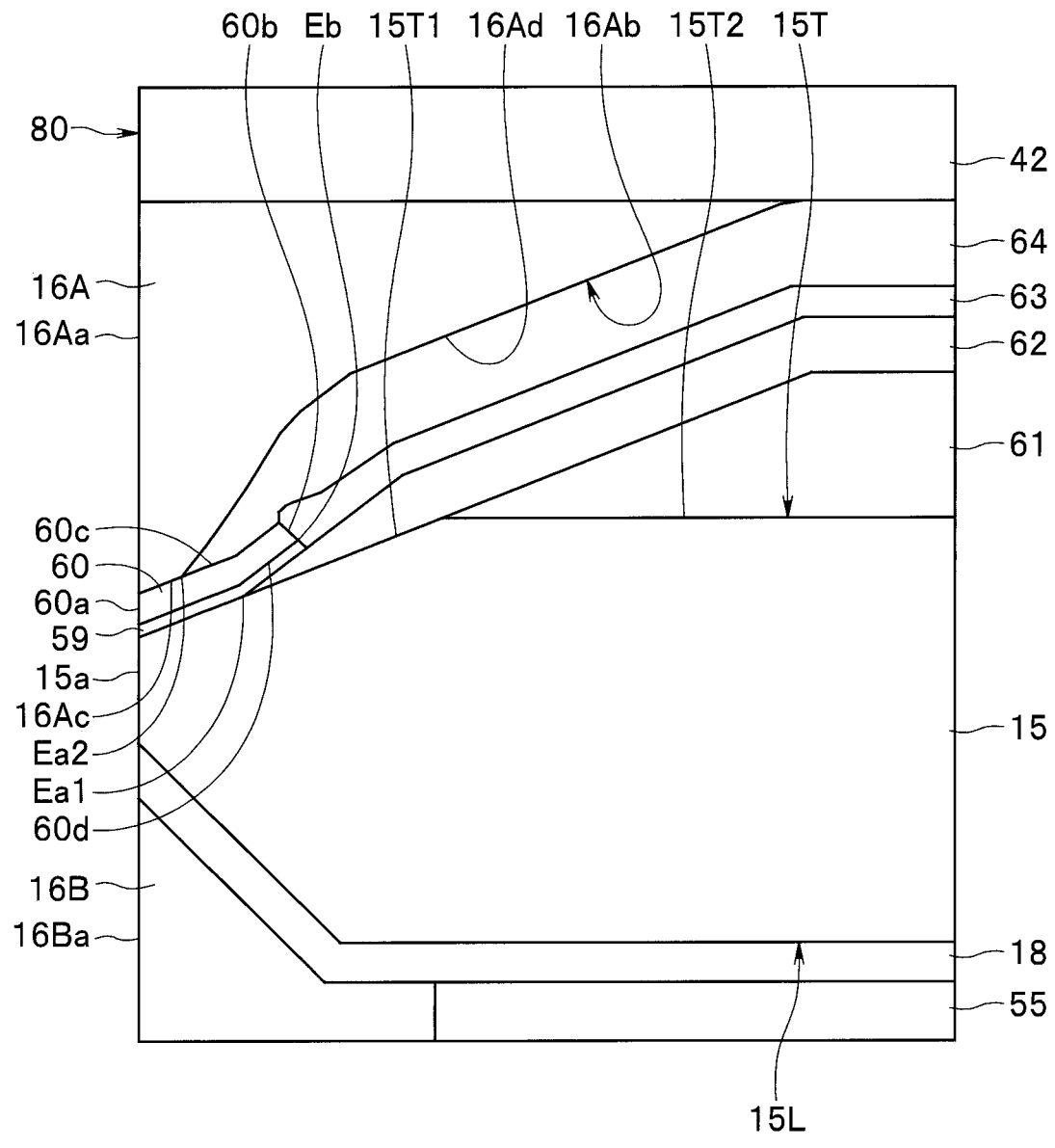
FIG. 17 is a cross-sectional view showing essential parts of a magnetic head according to a second embodiment of the invention.

Next, a second embodiment of the invention will be described. FIG. 17 is a cross-sectional view showing essential parts of the magnetic head 100 according to the present embodiment.

The magnetic head 100 according to the present embodiment is different from that of the first embodiment in the following point. In the present embodiment, the position of the second end Ea2 of the second insulating layer 64 relative to the first end Ea1 of the first insulating layer 62 is different from that in the first embodiment. In the present embodiment, the first end Ea1 of the first insulating layer 62 is located farther from the medium facing surface 80 than the second end Ea2 of the second insulating layer 64 is. In other words, the second end Ea2 of the second insulating layer 64 is located closer to the medium facing surface 80 than the first end Ea1 of the first insulating layer 62 is. The distance from the medium facing surface 80 to the first end Ea1 is in the range of 25 to 60 nm, for example. The distance from the medium facing surface 80 to the second end Ea2 is in the range of 10 to 35 nm, for example.

The other configuration, function and effects of the present embodiment are similar to those of the first embodiment.

Third Embodiment

Figure 18:
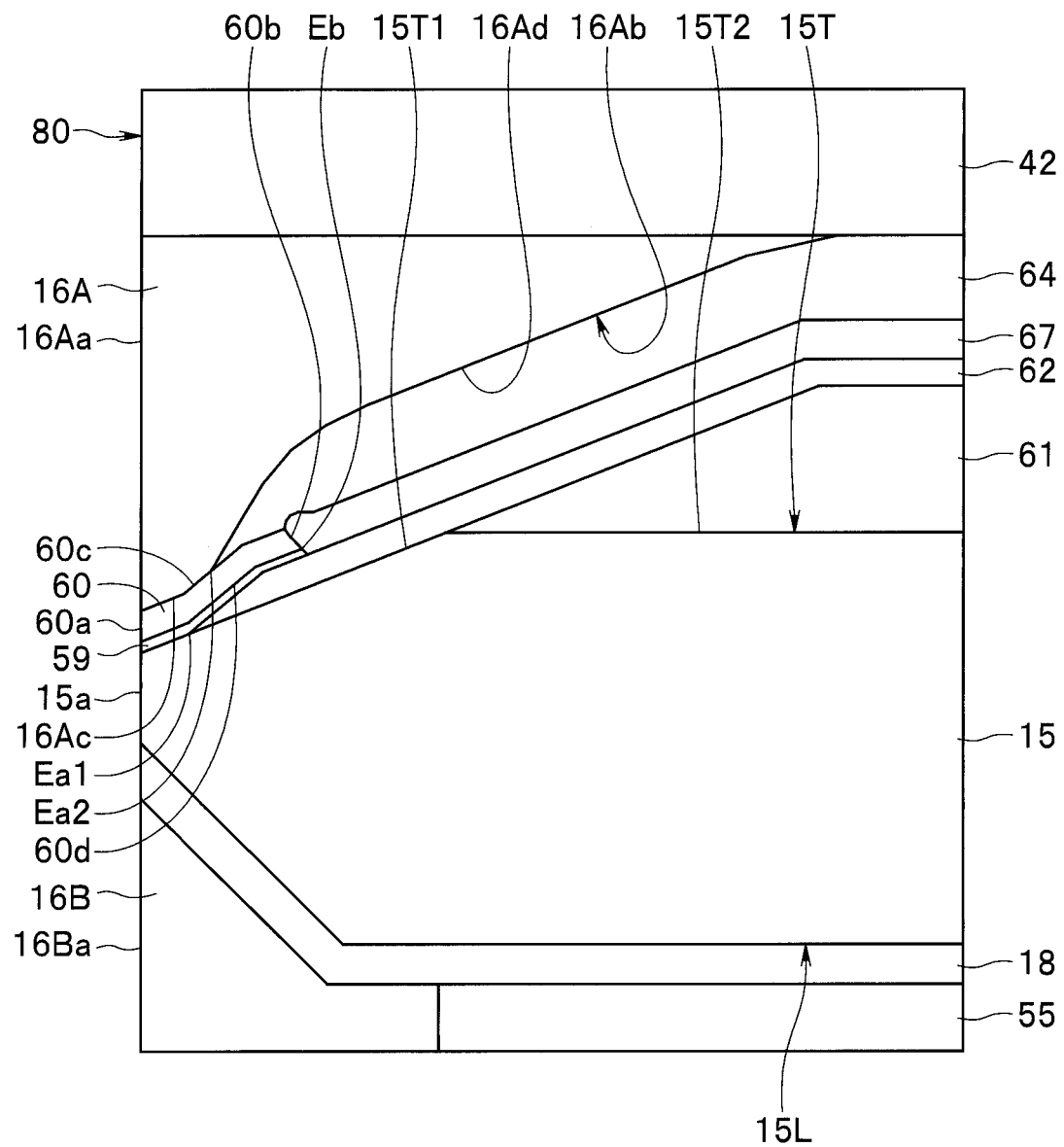
FIG. 18 is a cross-sectional view showing essential parts of a magnetic head according to a third embodiment of the invention.

Next, a third embodiment of the invention will be described. FIG. 18 is a cross-sectional view showing essential parts of the magnetic head 100 according to the present embodiment.

The magnetic head 100 according to the present embodiment is different from that of the first embodiment in the following point. The magnetic head 100 according to the present embodiment includes a heat sink 67 instead of the insulating layer 63 in the first embodiment. The layout of the heat sink 67 is the same as that of the insulating layer 63 in the first embodiment. More specifically, the heat sink 67 is disposed between the main pole 15 and the trailing shield 16A at a position farther from the medium facing surface 80 than the spin torque oscillator 60 is. The heat sink 67 is in contact with the rear end face 60b of the spin torque oscillator 60. The heat sink 67 has a thickness in the range of 10 to 70 nm, for example.

The heat sink 67 is formed of a nonmagnetic metal material. Specifically, the heat sink 67 is formed of one of Ru, Cr, Ta, W, Mo, Al, Pt, Rh, Ir, Au, Ag, and Cu, or an alloy of two or more of such elements, for example.

A method for forming the heat sink 67 is basically the same as that for forming the insulating layer 63, described in the first embodiment with reference to FIG. 13. The heat sink 67 is formed by an ion beam deposition, for example.

The heat sink 67 has a function of dissipating heat generated by the spin torque oscillator 60 to outside the spin torque oscillator 60. According to the present embodiment, the heat sink 67 can suppress an increase in the temperature of the spin torque oscillator 60, and consequently can prevent the life of the magnetic head 100 from being shortened by the heat generation of the spin torque oscillator 60.

The heat sink 67 in the present embodiment may also be included in the magnetic head 100 according to the second embodiment. In such a case, the layout of the heat sink 67 is the same as that of the insulating layer 63 in the second embodiment. The other configuration, function, and effects of the present embodiment are similar to those of the first or second embodiment.

Fourth Embodiment

Figure 19:
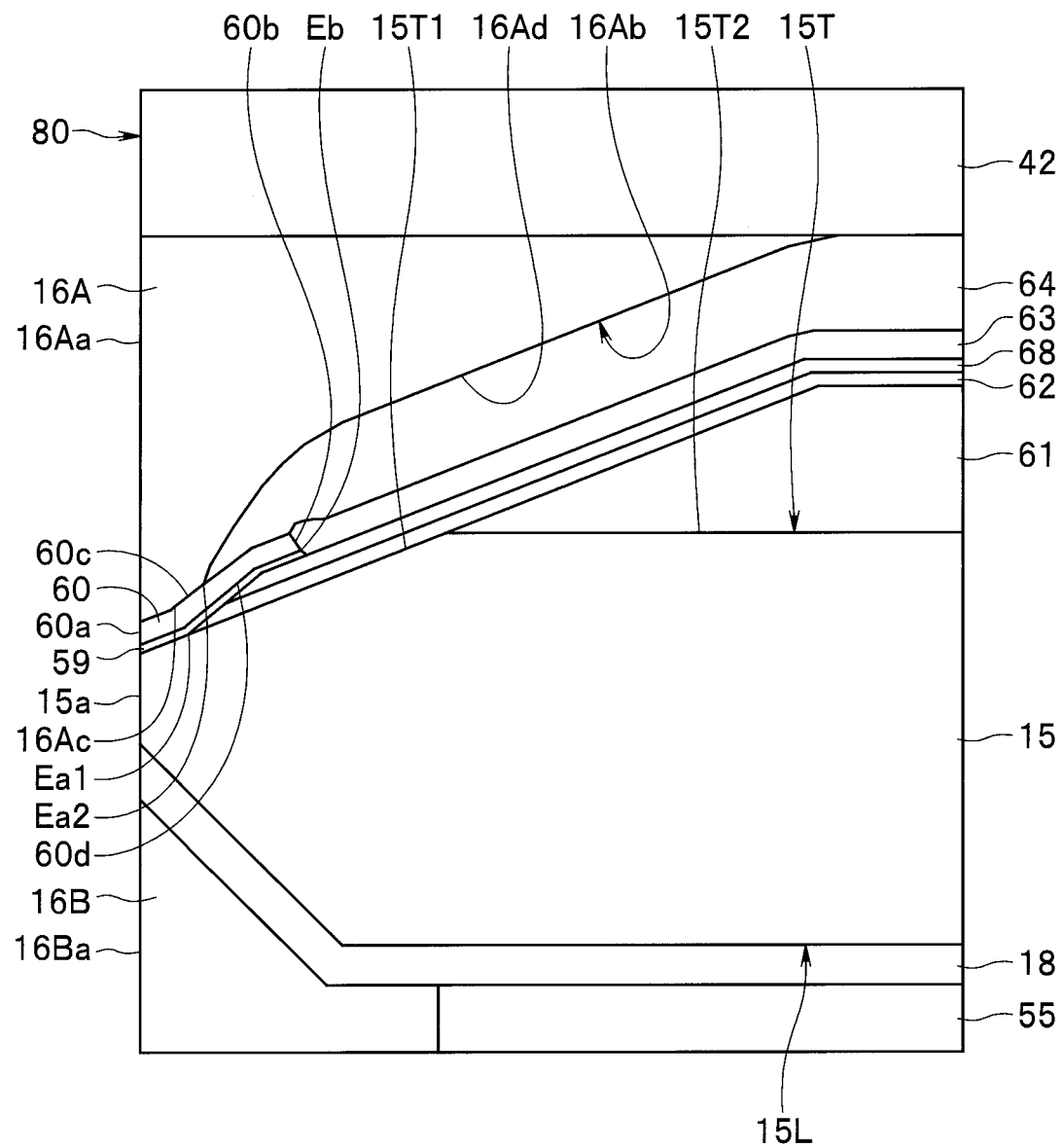
FIG. 19 is a cross-sectional view showing essential parts of a magnetic head according to a fourth embodiment of the invention.

Next, a fourth embodiment of the invention will be described. FIG. 19 is a cross-sectional view showing essential parts of the magnetic head 100 according to the present embodiment.

The magnetic head 100 according to the present embodiment is different from that of the first embodiment in the following point. The magnetic head 100 according to the present embodiment includes a first heat sink 68 disposed on the insulating layer 62. A portion of the first heat sink 68 is interposed between the spin torque oscillator 60 and the first insulating layer 62. The buffer layer 59 is interposed between a portion of the first heat sink 68 and the spin torque oscillator 60, and in contact with the first heat sink 68 and the spin torque oscillator 60. The first heat sink 68 is formed of the same material as that of the heat sink 67 in the third embodiment, for example.

Now, a method for forming the first heat sink 68 will be briefly described. A step of forming the first heat sink 68 is performed after the step of forming the insulating layer 62 and before the step of forming the buffer layer 59. In the step of forming the first heat sink 68, the first heat sink 68 is formed by a lift-off method, for example.

The function and effects of the first heat sink 68 are the same as those of the heat sink 67 in the third embodiment.

The other configuration, function, and effects of the present embodiment are similar to those of the first embodiment.

Fifth Embodiment

Figure 20:
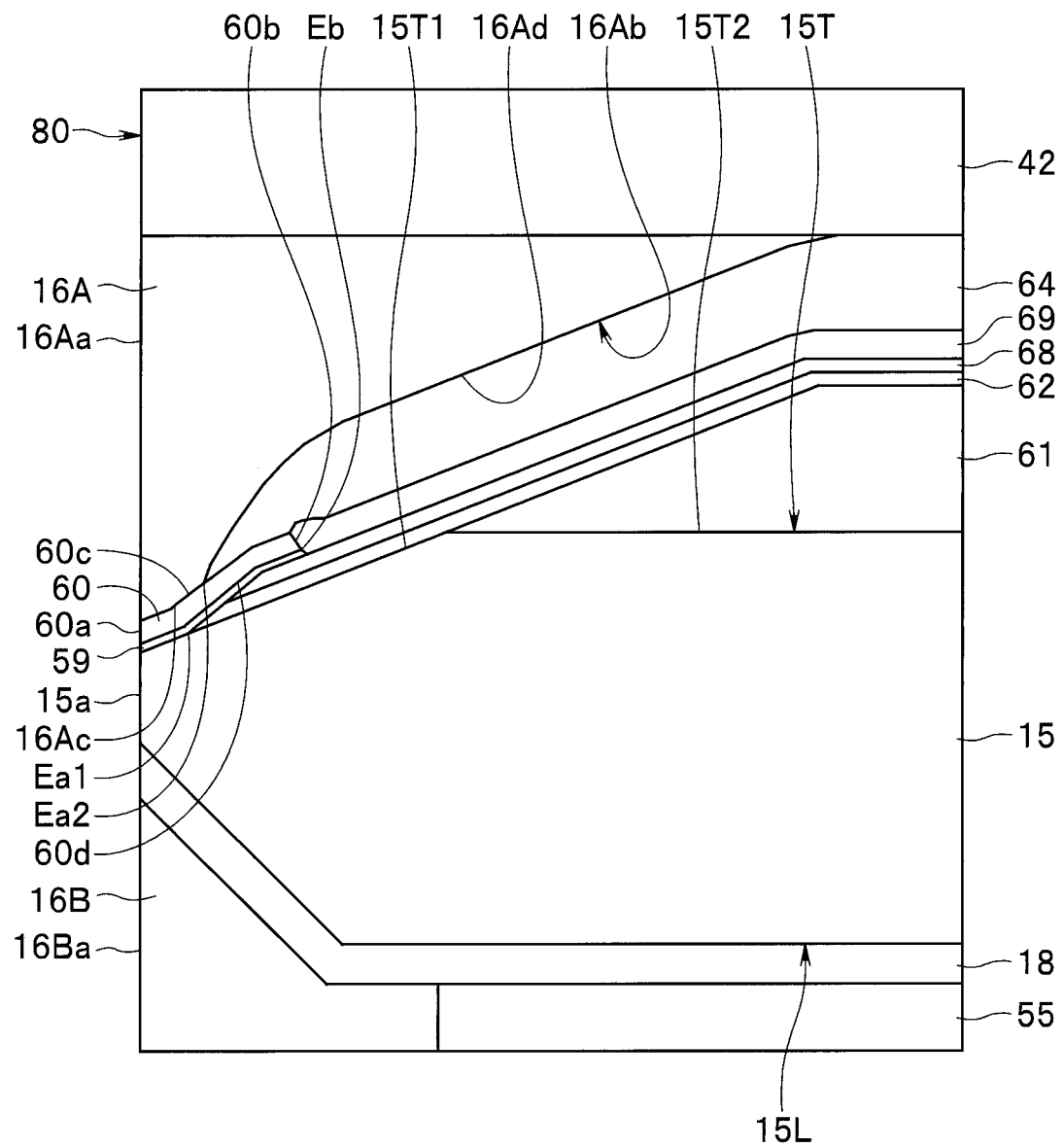
FIG. 20 is a cross-sectional view showing essential parts of a magnetic head according to a fifth embodiment of the invention.

Next, a fifth embodiment of the invention will be described. FIG. 20 is a cross-sectional view showing essential parts of the magnetic head 100 according to the present embodiment.

The magnetic head 100 according to the present embodiment is different from that of the fourth embodiment in the following point. The magnetic head 100 according to the present embodiment includes a second heat sink 69 in addition to the first heat sink 68. The second heat sink 69 is disposed on the first heat sink 68 at a position farther from the medium facing surface 80 than the spin torque oscillator 60 is, and in contact with the rear end face 60b of the spin torque oscillator 60 and the first heat sink 68. The second heat sink 69 is formed of the same material as that of the first heat sink 68, for example.

The function and effects of the second heat sink 69 are the same as those of the first heat sink 68 in the fourth embodiment. According to the present embodiment, an increase in the temperature of the spin torque oscillator 60 can be more effectively suppressed by the first and second heat sinks 68 and 69. As a result, the life of the magnetic head 100 can be prevented from being shortened by the heat generation of the spin torque oscillator 60.

The other configuration, function, and effects of the present embodiment are similar to those of the fourth embodiment.

Sixth Embodiment

Figure 21:
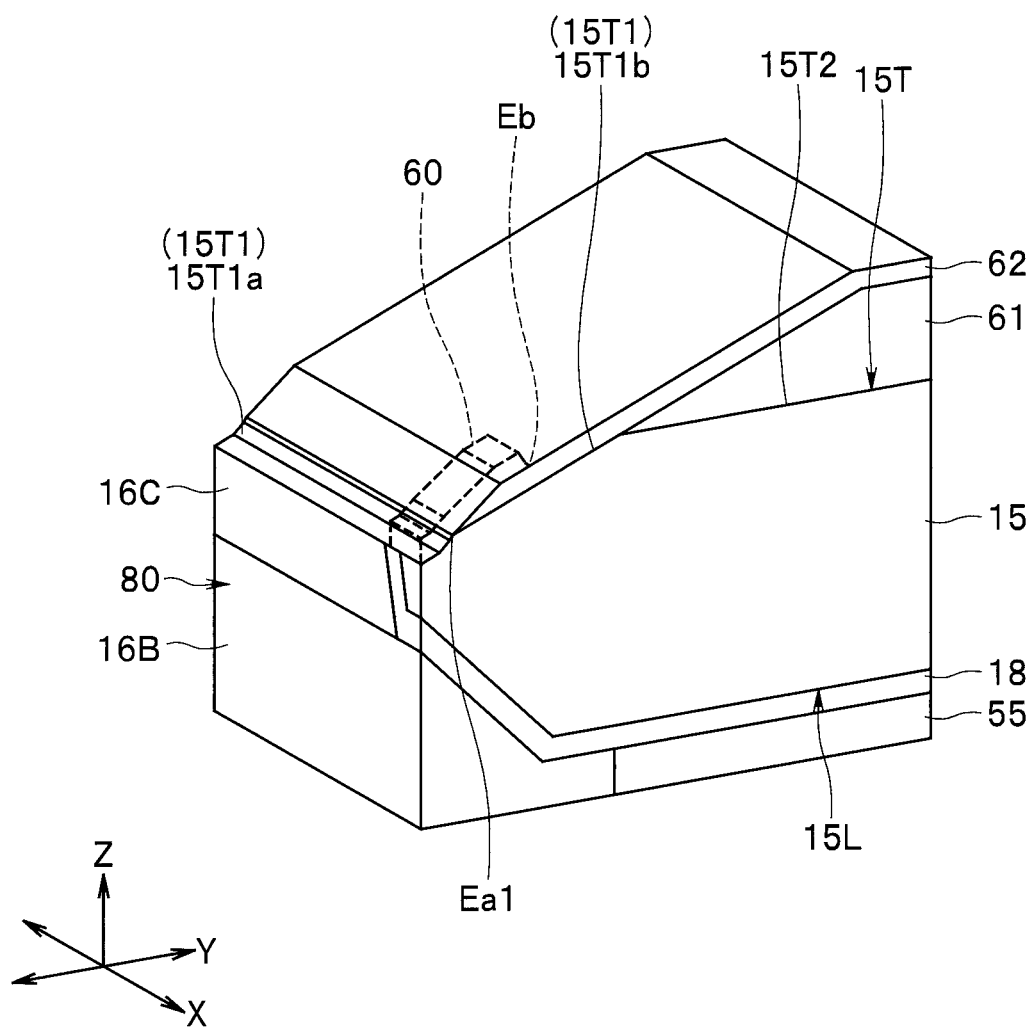
FIG. 21 is a perspective view showing essential parts of a magnetic head according to a sixth embodiment of the invention.
Figure 22:
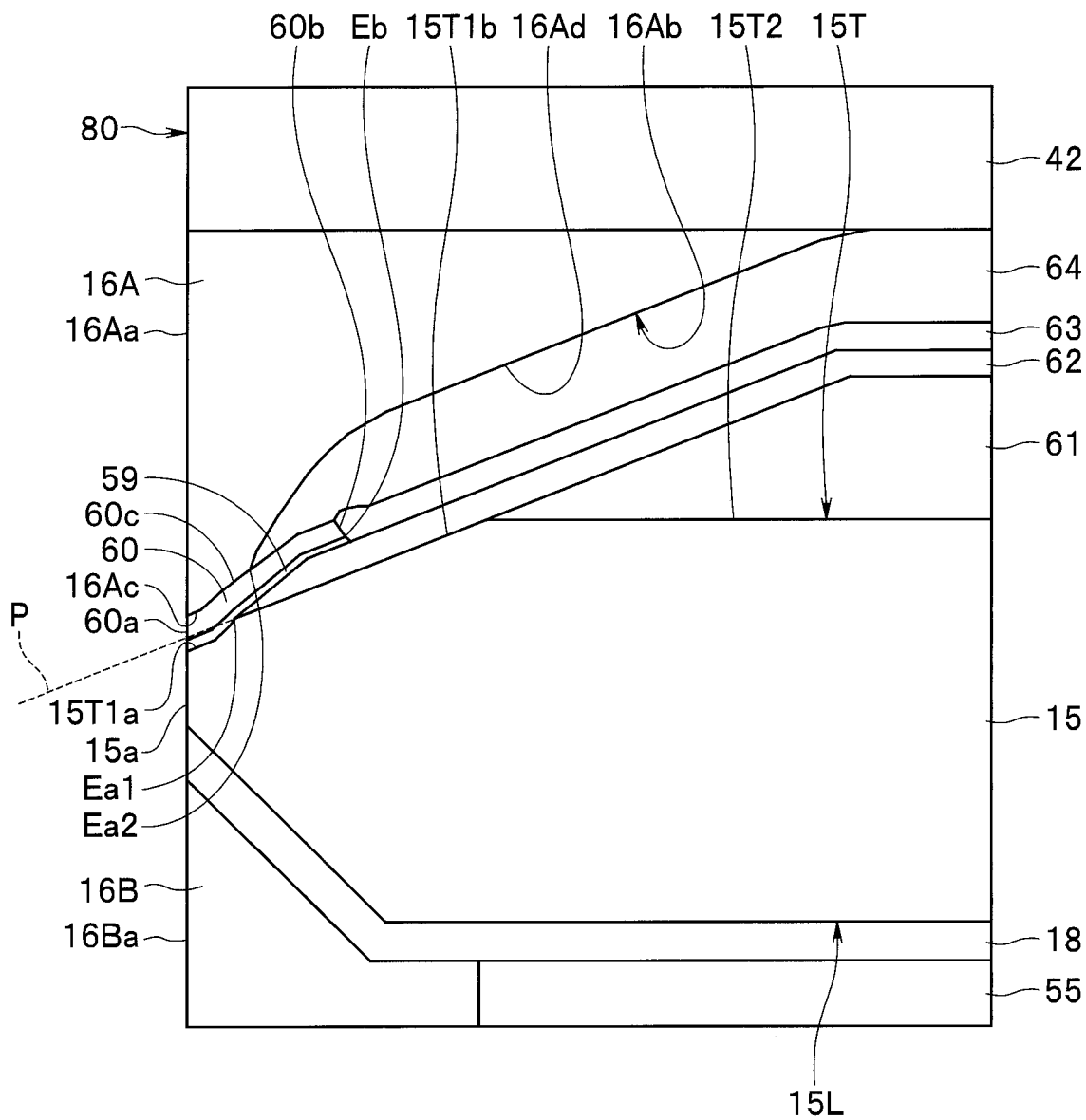
FIG. 22 is a cross-sectional view showing the essential parts of the magnetic head according to the sixth embodiment of the invention.

Next, a sixth embodiment of the invention will be described. Reference is first made to FIG. 21 and FIG. 22 to describe differences of the magnetic head 100 according to the present embodiment from that according to the first embodiment. FIG. 21 is a perspective view showing essential parts of the magnetic head 100 according to the present embodiment. FIG. 22 is a cross-sectional view showing essential parts of the magnetic head 100 according to the present embodiment.

In the present embodiment, the inclined portion 15T1 of the top surface 15T of the main pole 15 includes a rear portion 15T1b in contact with the first insulating layer 62, and a front portion 15T1a located between the medium facing surface 80 and the rear portion 15T1b and not in contact with the first insulating layer 62. A portion of the buffer layer 59 is interposed between a portion of the spin torque oscillator 60 and the front portion 15T1a and in contact with the front portion 15T1a. The first end Ea1 of the first insulating layer 62 is located near the border between the front portion 15T1a and the rear portion 15T1b.

In FIG. 22, the symbol P represents an imaginary plane including the rear portion 15T1b. The front portion 15T1a is recessed from the imaginary plane P in a direction away from the trailing shield 16A (toward the top surface 1a of the substrate 1). The maximum size of the recess of the front portion 15T1a from the imaginary plane P is in the range of 10 to 60 nm, for example.

Next, a function and effects specific to the magnetic head 100 according to the present embodiment will be described. Given that the dimension of the end face 15a of the main pole 15 in the direction perpendicular to the top surface 1a of the substrate 1 (Z direction) is the same, the present embodiment can increase the cross-sectional area of the rear portion 15T1b of the main pole 15, compared to the main pole 15 without the foregoing recessed front portion 15T1a. According to the present embodiment, the cross-sectional area of the main pole near the medium facing surface 80 can thus be increased, and as a result, the recording characteristics can be improved.

Figure 23:
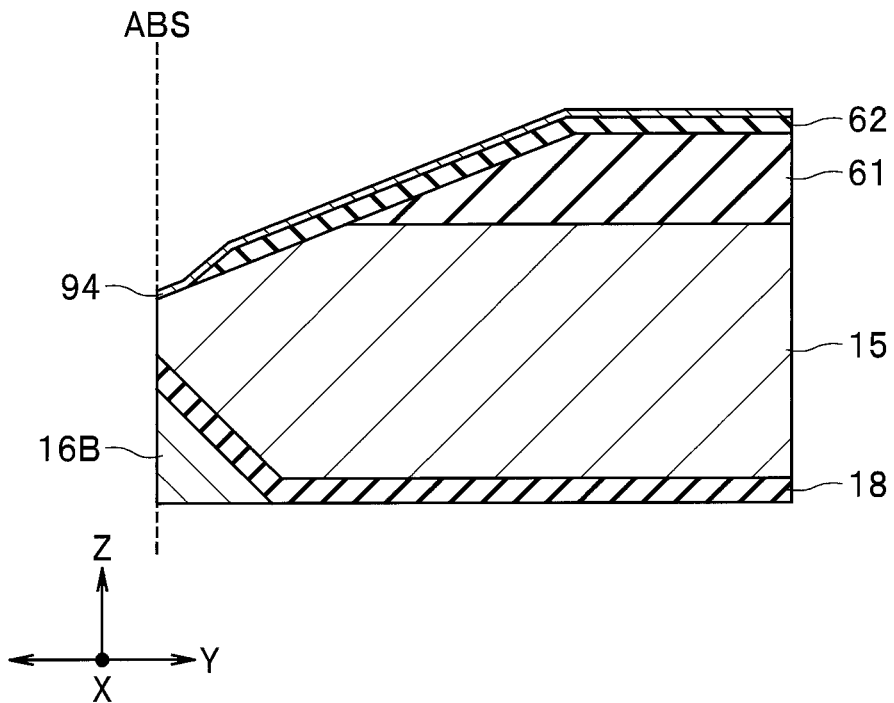
FIG. 23 is a cross-sectional view showing a step of a manufacturing method for the magnetic head according to the sixth embodiment of the invention.
Figure 24:
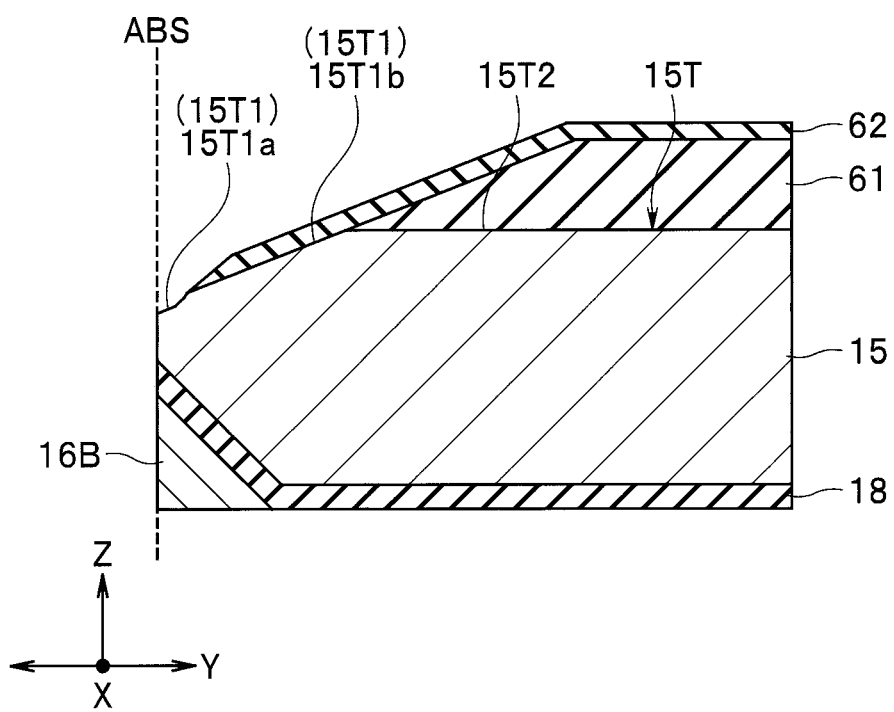
FIG. 24 is a cross-sectional view showing a step that follows the step shown in FIG. 23.
Figure 25:
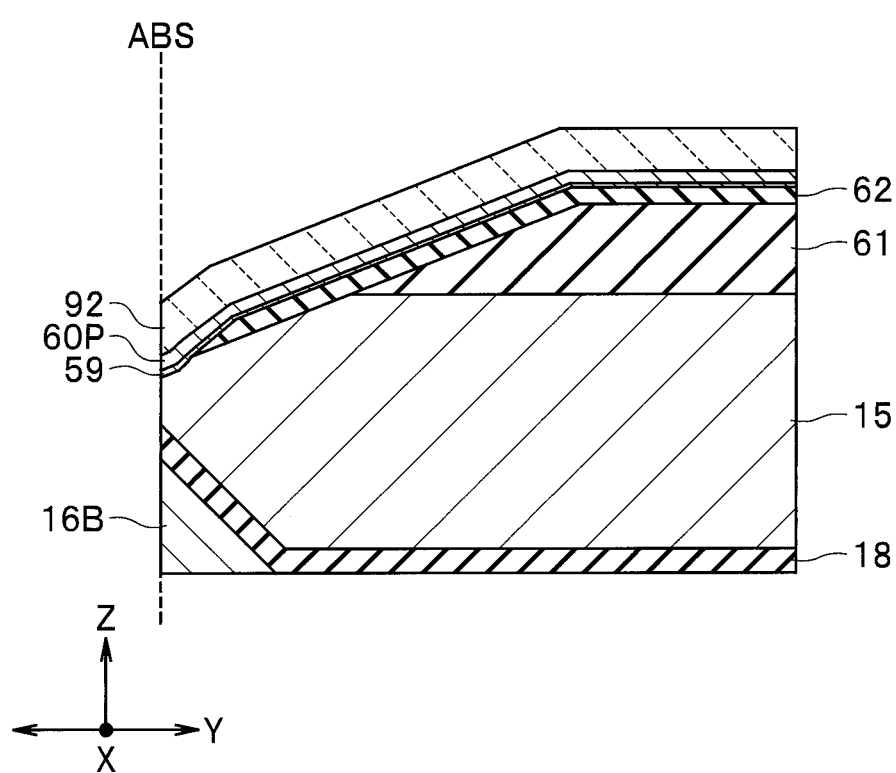
FIG. 25 is a cross-sectional view showing a step that follows the step shown in FIG. 24.

Next, a manufacturing method for the magnetic head 100 according to the present embodiment will be described with reference to FIG. 23 to FIG. 25. FIG. 23 to FIG. 25 each show a stack of layers formed in the process of manufacturing the magnetic head 100 according to the present embodiment. FIG. 23 to FIG. 25 show, on an enlarged scale, the stack near the position where the medium facing surface 80 is to be formed. FIG. 23 to FIG. 25 each show a cross section perpendicular to the medium facing surface 80 and the top surface 1a of the substrate 1. In FIG. 23 to FIG. 25 the symbol ABS represents the position where the medium facing surface 80 is to be formed.

The manufacturing method for the magnetic head 100 according to the present embodiment is the same as the method according to the first embodiment up to the step of forming the insulating layer 62. FIG. 23 shows a step after the insulating layer 62 is formed and then the mask 91 is lifted off. In this step, a nonmagnetic metal layer 94 is formed of Ru or Ta on the main pole 15 and the insulating layer 62.

FIG. 24 shows the next step. In this step, the nonmagnetic metal layer 94 is etched by, e.g., IBE until the insulating layer 62 is exposed. The etching of the nonmagnetic metal layer 94 is followed by etching of the inclined portion 15T1 of the top surface 15T of the main pole 15. This forms the front portion 15T1a on the inclined portion 15T1. The portion of the inclined portion 15T1 left unetched makes the rear portion 15T1b.

FIG. 25 shows the next step. In this step, the buffer layer 59, the layered film 60P, the second gap layer 19, and the protective layer 92 are formed as in the step described in the first embodiment with reference to FIG. 11. The subsequent steps are the same as those in the first embodiment.

The other configuration, function, and effects of the present embodiment are similar to those of the first embodiment.

Seventh Embodiment

Figure 26:
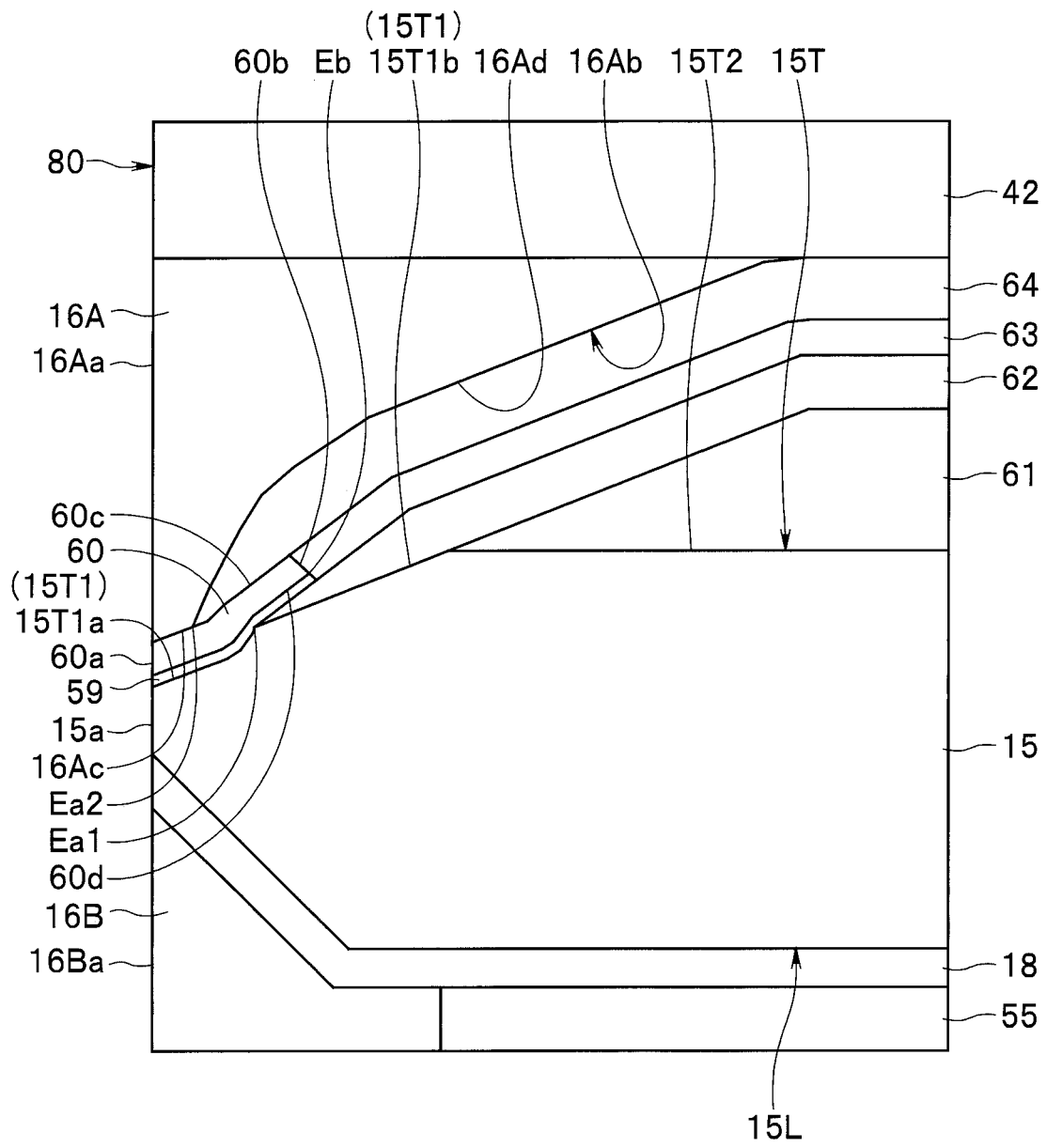
FIG. 26 is a cross-sectional view showing essential parts of a magnetic head according to a seventh embodiment of the invention.

Next, a seventh embodiment of the invention will be described. FIG. 26 is a cross-sectional view showing essential parts of the magnetic head 100 according to the present embodiment.

The magnetic head 100 according to the present embodiment is different from that of the sixth embodiment in the following point. In the present embodiment, the position of the second end Ea2 of the second insulating layer 64 relative to the first end Ea1 of the first insulating layer 62 is different from that in the sixth embodiment. In the present embodiment, the first end Ea1 of the first insulating layer 62 is located farther from the medium facing surface 80 than the second end Ea2 of the second insulating layer 64 is. In other words, the second end Ea2 of the second insulating layer 64 is located closer to the medium facing surface 80 than the first end Ea1 of the first insulating layer 62 is. The distance from the medium facing surface 80 to the first end Ea1 is in the range of 25 to 60 nm, for example. The distance from the medium facing surface 80 to the second end Ea2 is in the range of 10 to 35 nm, for example.

In the present embodiment, the first end Ea1 of the first insulating layer 62 is located farther from the medium facing surface 80 than in the sixth embodiment. As a result, the border between the front and rear portions 15T1a and 15T1b of the inclined portion 15T1 of the top surface 15T of the main pole 15 is also located farther from the medium facing surface 80 than in the sixth embodiment.

The other configuration, function, and effects of the present embodiment are similar to those of the sixth embodiment.

Eighth Embodiment

Figure 27:
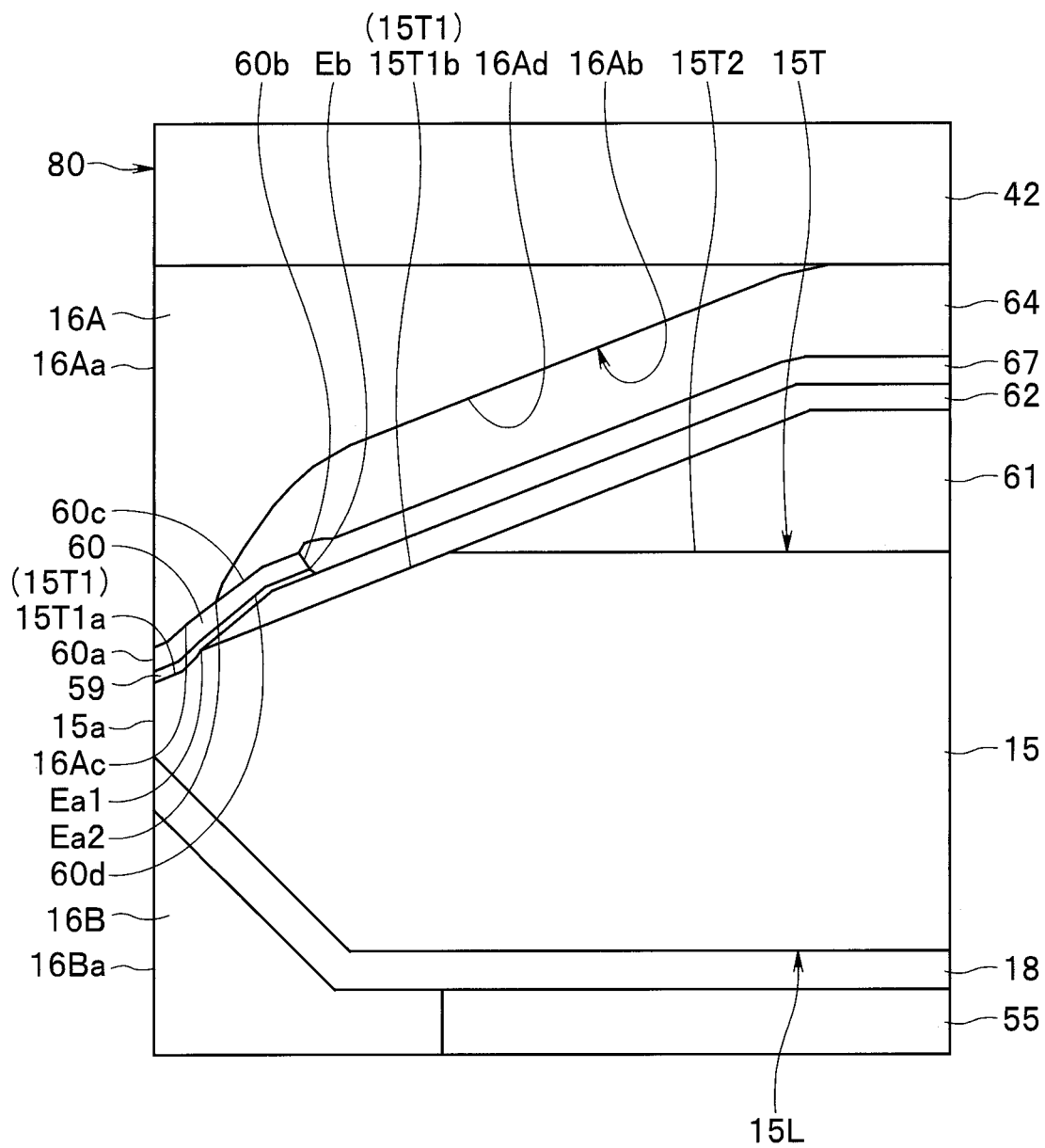
FIG. 27 is a cross-sectional view showing essential parts of a magnetic head according to an eighth embodiment of the invention.

Next, an eighth embodiment of the invention will be described. FIG. 27 is a cross-sectional view showing essential parts of the magnetic head 100 according to the present embodiment.

The magnetic head 100 according to the present embodiment is different from that of the sixth embodiment in the following point. The magnetic head 100 according to the present embodiment includes the heat sink 67 described in the third embodiment instead of the insulating layer 63 in the sixth embodiment. The layout of the heat sink 67 is the same as that of the insulating layer 63 in the sixth embodiment.

The heat sink 67 may be included in the magnetic head 100 according to the seventh embodiment. In such a case, the layout of the heat sink 67 is the same as that of the insulating layer 63 in the seventh embodiment.

The other configuration, function, and effects of the present embodiment are similar to those of one of the third, sixth, and seventh embodiments.

Ninth Embodiment

Figure 28:
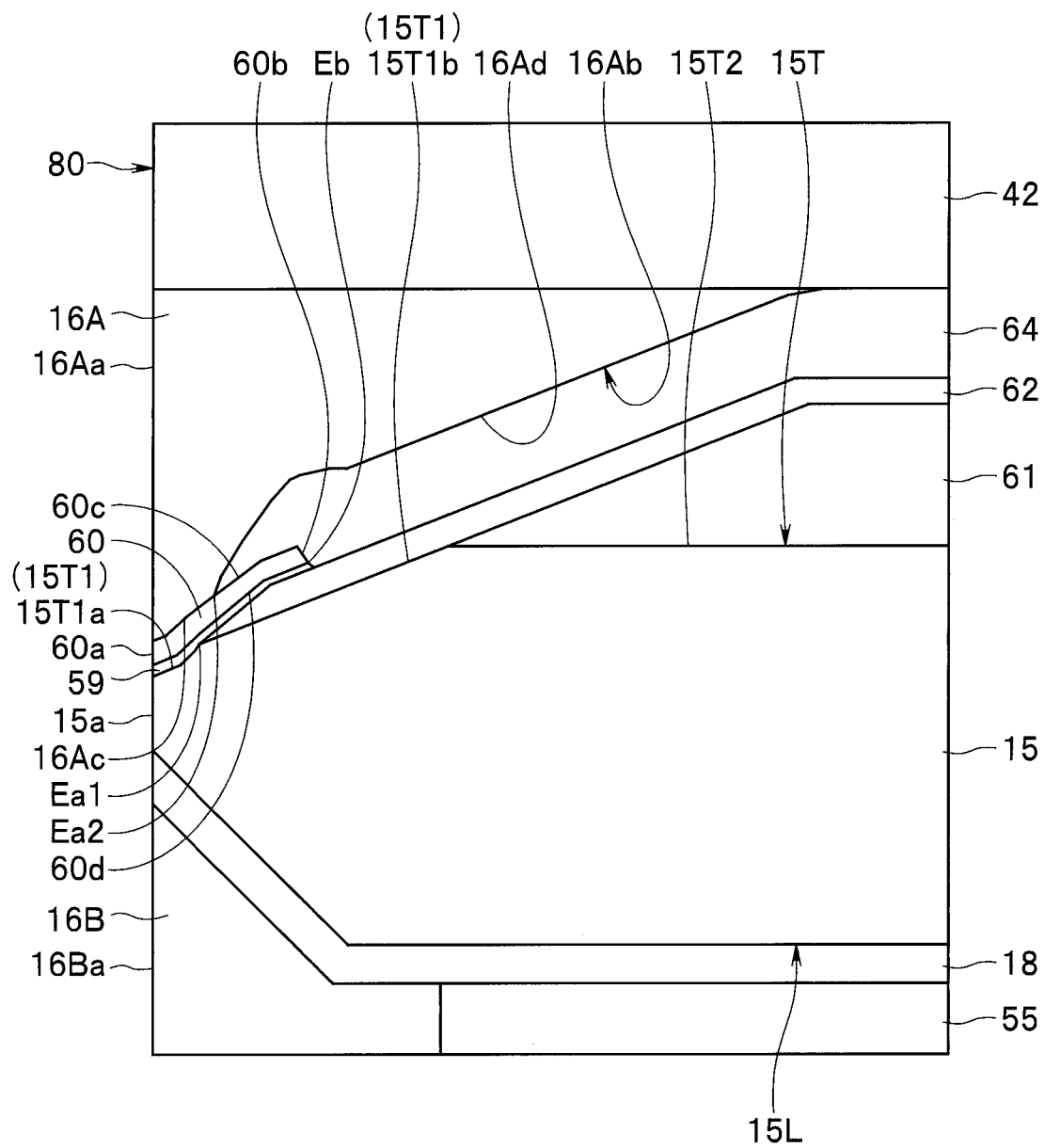
FIG. 28 is a cross-sectional view showing essential parts of a magnetic head according to a ninth embodiment of the invention.

Next, a ninth embodiment of the invention will be described. FIG. 28 is a cross-sectional view showing essential parts of the magnetic head 100 according to the present embodiment.

The magnetic head 100 according to the present embodiment is different from that of the sixth embodiment in the following point. The present embodiment does not include the insulating layer 63 in the sixth embodiment. The insulating layer 64 is disposed to cover a portion of the spin torque oscillator 60 and the insulating layer 62.

A method for manufacturing the magnetic head 100 according to the present embodiment is the same as that for manufacturing the magnetic head 100 in the sixth embodiment except that the step of forming the insulating layer 63 is not performed. In the present embodiment, the step of forming the insulating layer 63 can be omitted. According to the present embodiment, the manufacturing cost can thus be reduced.

Like the present embodiment, the magnetic head 100 according to the seventh embodiment may also be configured not to include the insulating layer 63. The other configuration, function and effects of the present embodiment are similar to those of the sixth or seventh embodiment.

Tenth Embodiment

Figure 29:
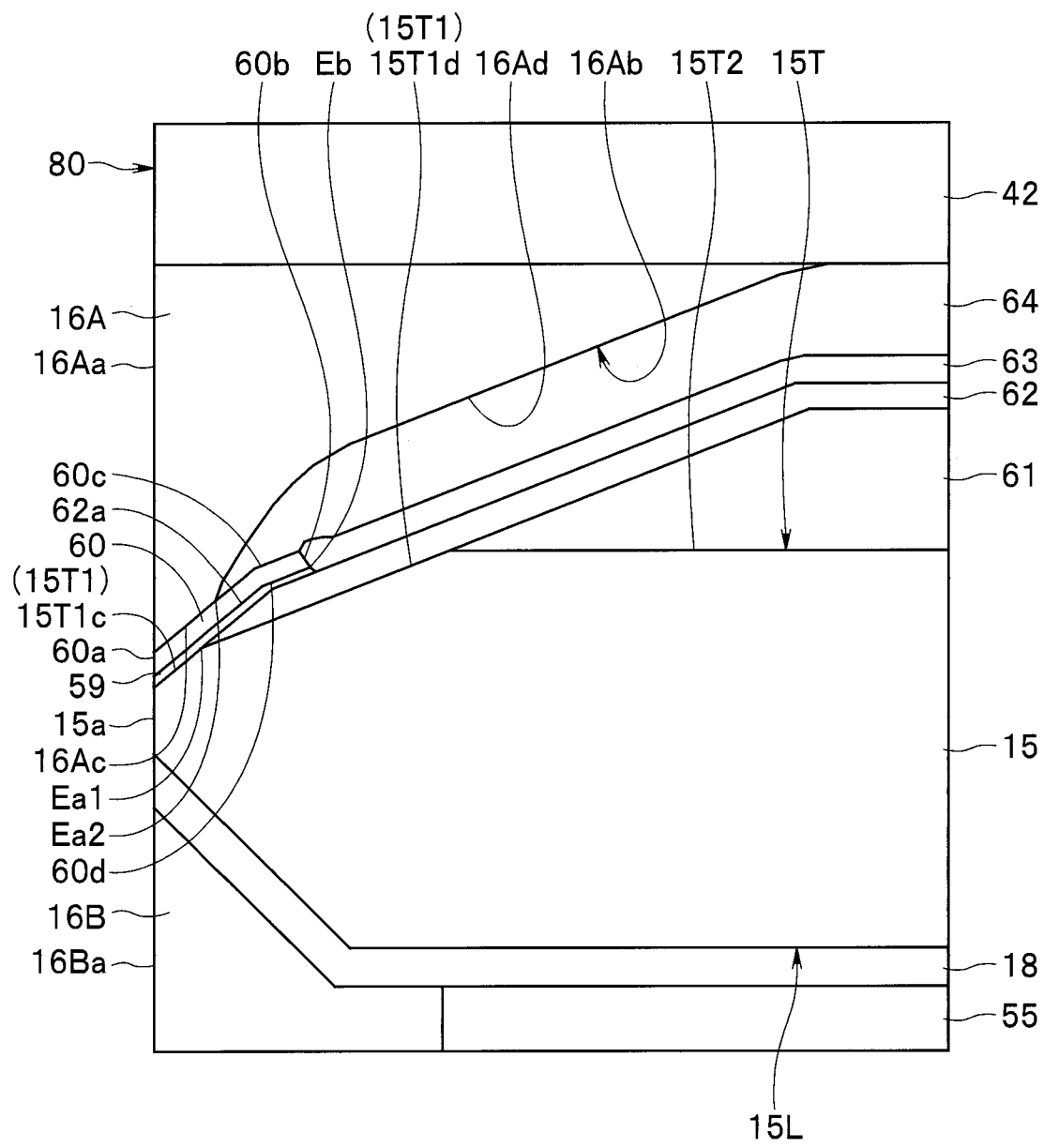
FIG. 29 is a cross-sectional view showing essential parts of a magnetic head according to a tenth embodiment of the invention.

Next, a tenth embodiment of the invention will be described. Reference is first made to FIG. 29 to describe differences of the magnetic head 100 according to the present embodiment from that of the first embodiment. FIG. 29 is a cross-sectional view showing essential parts of the magnetic head 100 according to the present embodiment.

In the present embodiment, the inclined portion 15T1 of the top surface 15T of the main pole 15 includes a rear portion 15T1d in contact with the first insulating layer 62, and a front portion 15T1c located between the medium facing surface 80 and the rear portion 15T1d and not in contact with the first insulating layer 62. A portion of the buffer layer 59 is interposed between a portion of the spin torque oscillator 60 and the front portion 15T1c and in contact with the front portion 15T1c. The first end Ea1 of the first insulating layer 62 is located near the border between the front portion 15T1c and the rear portion 15T1d.

The first insulating layer 62 has an inclined surface 62a contiguous with the front portion 15T1c. An angle that the front portion 15T1c forms with respect to the direction perpendicular to the medium facing surface 80 is the same as an angle that the inclined surface 62a forms with respect to the direction perpendicular to the medium facing surface 80. Both the angle that the front portion 15T1c forms with respect to the direction perpendicular to the medium facing surface 80 and the angle that the inclined surface 62a forms with respect to the direction perpendicular to the medium facing surface 80 are greater than the angle that the rear portion 15T1d forms with respect to the direction perpendicular to the medium facing surface 80.

Now, a method for forming the front portion 15T1c will be briefly described. The front portion 15T1c can be formed, for example, by forming the insulating layer 62 and then taper etching the main pole 15 and the insulating layer 62.

Next, a function and effects specific to the magnetic head 100 according to the present embodiment will be described. Given that the dimension of the end face 15a of the main pole 15 in the direction perpendicular to the top surface 1a of the substrate 1 (Z direction) is the same, the present embodiment can increase the cross-sectional area of the portion of the main pole 15 including the rear portion 15T1d, compared to the main pole 15 without the foregoing inclined front portion 15T1c. According to the present embodiment, the cross-sectional area of the main pole near the medium facing surface 80 can thus be increased, and as a result, the recording characteristics can be improved.

The other configuration, function and effects of the present embodiment are similar to those of the first embodiment.

Eleventh Embodiment

Figure 30:
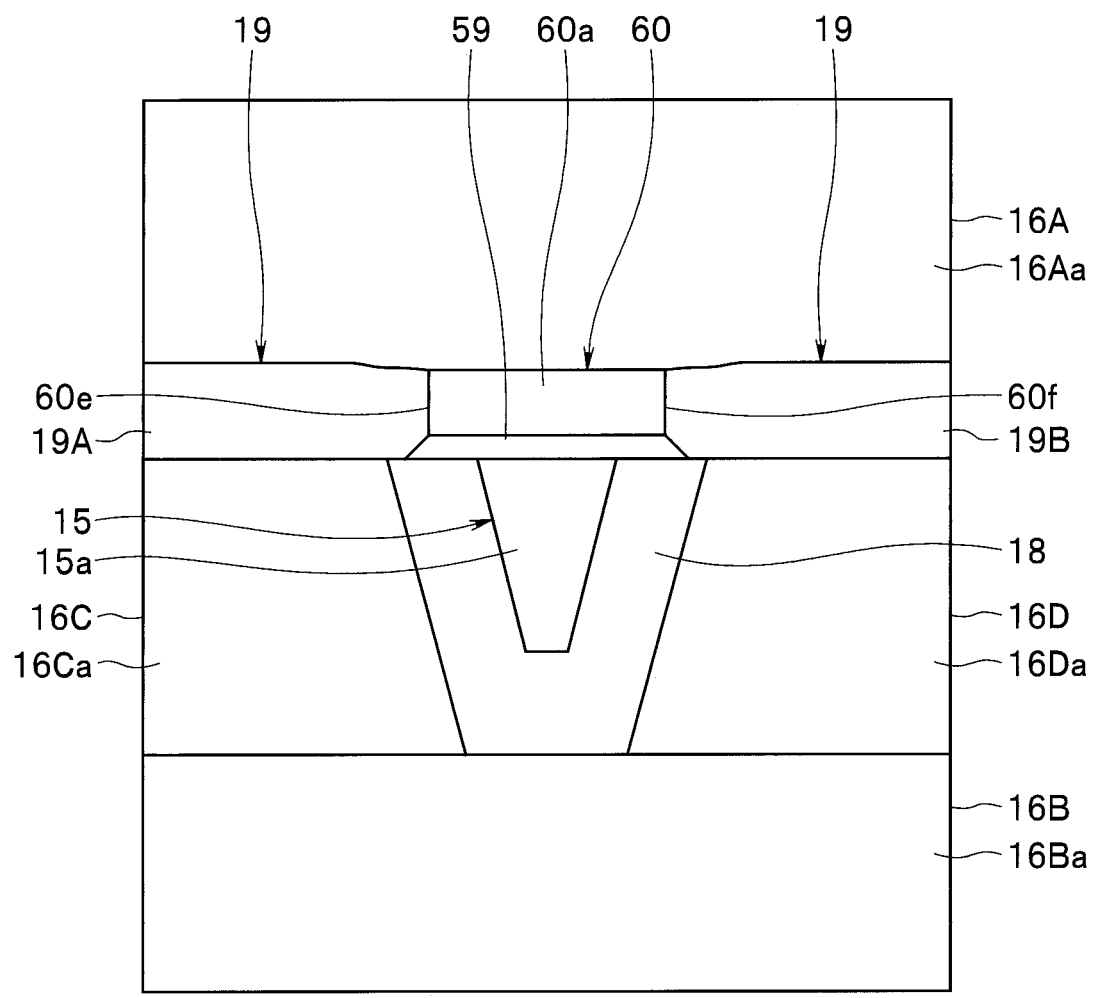
FIG. 30 is a front view showing essential parts of a magnetic head according to an eleventh embodiment of the invention.

Next, an eleventh embodiment of the invention will be described. FIG. 30 is a front view showing essential parts of the magnetic head 100 according to the present embodiment.

The magnetic head 100 according to the present embodiment is different from that of the first embodiment in the following point. In the present embodiment, the first and second side surfaces 60e and 60f of the spin torque oscillator 60 are perpendicular or substantially perpendicular to the top surface 1a (see FIG. 5 and FIG. 6) of the substrate 1. The first side surface 60e and the second side surface 60f respectively form a first angle and a second angle with respect to a direction perpendicular to the top surface 1a of the substrate 1. The first angle and the second angle are each preferably in the range of 0° to 15°, more preferably in the range of 0° to 10°.

Given the area of the bottom surface 60d of the spin torque oscillator 60 is the same, the present embodiment can increase the area of the top surface 60c of the spin torque oscillator 60 compared to the case where the first and second side surfaces 60e and 60f are oblique to the top surface 1a of the substrate 1. According to the present embodiment, the heat generation of the spin torque oscillator 60 due to a small contact area between the spin torque oscillator 60 and the trailing shield 16A can be suppressed. As a result, the life of the magnetic head 100 can be prevented from being shortened.

The other configuration, function, and effects of the present embodiment are similar to those of the first embodiment.

The present invention is not limited to the foregoing embodiments, and various modifications may be made thereto. As long as the requirements of the appended claims are met, the shape and layout of each of the spin torque oscillator 60 and the buffer layer 59 are not limited to the examples shown in the foregoing embodiments but can be freely chosen. For example, the front end face 60a of the spin torque oscillator 60 may be located away from the medium facing surface 80.

The configurations described in the embodiments can be freely combined unless a conflict occurs.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head comprising:
   a medium facing surface configured to face a recording medium;
   a main pole configured to generate a write magnetic field for writing data on the recording medium;
   a trailing shield formed of a magnetic material and located forward in a direction of travel of the recording medium relative to the main pole;
   a spin torque oscillator disposed between the main pole and the trailing shield and electrically connected to the main pole and the trailing shield; and
   a first insulating layer interposed between a portion of the main pole and a portion of the spin torque oscillator, wherein
   the first insulating layer has a first end closest to the medium facing surface,
   the spin torque oscillator has a rear end farthest from the medium facing surface, and
   the first end of the first insulating layer is located closer to the medium facing surface than the rear end of the spin torque oscillator is.

2. The magnetic head according to claim 1, wherein
   the main pole has a top surface facing toward the trailing shield,
   the trailing shield has a bottom surface facing toward the main pole,
   the bottom surface of the trailing shield includes a first portion having an end located in the medium facing surface and being in contact with the spin torque oscillator at least in part, and a second portion connected to the first portion at a position away from the medium facing surface,
   the first portion extends along the top surface of the main pole,
   a distance between the second portion and the main pole is a minimum at a border between the first portion and the second portion, and a maximum at a position away from the border, and
   an element height that is a dimension of the spin torque oscillator in a direction perpendicular to the medium facing surface and a writer height that is a dimension of the first portion in the direction perpendicular to the medium facing surface are different from each other.

3. The magnetic head according to claim 2, wherein the element height is greater than the writer height.

4. The magnetic head according to claim 3, wherein
   the element height is in a range of 40 to 100 nm, and
   the writer height is in a range of 10 to 35 nm.

5. The magnetic head according to claim 3, further comprising a second insulating layer interposed between a portion of the trailing shield and a portion of the spin torque oscillator, wherein
   the second insulating layer has a second end closest to the medium facing surface, and
   the second end of the second insulating layer is located closer to the medium facing surface than the rear end of the spin torque oscillator is.

6. The magnetic head according to claim 5, wherein the first end of the first insulating layer is located closer to the medium facing surface than the second end of the second insulating layer is.

7. The magnetic head according to claim 5, wherein the second end of the second insulating layer is located closer to the medium facing surface than the first end of the first insulating layer is.

8. The magnetic head according to claim 1, further comprising a heat sink, wherein
   the heat sink is disposed between the main pole and the trailing shield at a position farther from the medium facing surface than the spin torque oscillator is, and in contact with the spin torque oscillator.

9. The magnetic head according to claim 1, further comprising a first heat sink, wherein
   a portion of the first heat sink is interposed between the spin torque oscillator and the first insulating layer.

10. The magnetic head according to claim 9, further comprising a second heat sink, wherein
    the second heat sink is disposed on the first heat sink at a position farther from the medium facing surface than the spin torque oscillator is, and in contact with the spin torque oscillator and the first heat sink.

11. The magnetic head according to claim 1, wherein
    the top surface of the main pole includes a rear portion in contact with the first insulating layer, and a front portion located between the medium facing surface and the rear portion and not in contact with the first insulating layer, and the front portion is recessed from an imaginary plane including the rear portion in a direction away from the trailing shield.

12. The magnetic head according to claim 1, wherein the top surface of the main pole includes a rear portion in contact with the first insulating layer, and a front portion located between the medium facing surface and the rear portion and not in contact with the first insulating layer, the first insulating layer has an inclined surface contiguous with the front portion, and an angle that the front portion forms with respect to the direction perpendicular to the medium facing surface is greater than an angle that the rear portion forms with respect to the direction perpendicular to the medium facing surface.

13. The magnetic head according to claim 1, further comprising a substrate having a top surface, wherein the main pole, the trailing shield, the spin torque oscillator, and the first insulating layer are located above the top surface of the substrate, the spin torque oscillator has a first side surface and a second side surface opposite to each other in a track width direction, the first side surface and the second side surface respectively form a first angle and a second angle with respect to a direction perpendicular to the top surface of the substrate, and the first angle and the second angle are each in a range of 0° to 10°.

* * * * *